US012283191B2

(12) United States Patent
Ucar et al.

(10) Patent No.: US 12,283,191 B2
(45) Date of Patent: Apr. 22, 2025

(54) SYSTEMS AND METHODS TO FORM KNOWLEDGE HUBS FOR SAFETY GUIDELINES

(71) Applicant: TOYOTA MOTOR ENGINEERING & MANUFACTURING NORTH AMERICA, INC., Plano, TX (US)

(72) Inventors: Seyhan Ucar, Mountain View, CA (US); Takamasa Higuchi, Mountain View, CA (US); Onur Altintas, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 17/950,042

(22) Filed: Sep. 21, 2022

(65) Prior Publication Data

US 2024/0096218 A1 Mar. 21, 2024

(51) Int. Cl.
*G08G 1/16* (2006.01)
*G08G 1/00* (2006.01)

(52) U.S. Cl.
CPC ............... *G08G 1/167* (2013.01); *G08G 1/22* (2013.01)

(58) Field of Classification Search
None
See application file for complete search history.

(56) References Cited

U.S. PATENT DOCUMENTS

| | | | | |
|---|---|---|---|---|
| 8,352,111 | B2 | 1/2013 | Mudalige | |
| 9,283,963 | B2 | 3/2016 | Taner | |
| 9,749,811 | B2 * | 8/2017 | Tosa | G08G 1/096791 |
| 10,217,357 | B1 * | 2/2019 | Elsheemy | B60Q 9/00 |
| 10,565,893 | B2 | 2/2020 | McQuade | |
| 10,953,873 | B2 * | 3/2021 | Buerkle | B60W 60/0015 |

(Continued)

FOREIGN PATENT DOCUMENTS

| | | | | |
|---|---|---|---|---|
| CN | 113165665 A | | 7/2021 | |
| GB | 2505545 | | 3/2014 | |
| TW | I746930 B | * | 11/2021 | G08G 1/091 |

OTHER PUBLICATIONS

Title: Colored bicycle lanes and intersection treatments: International overview and best practices; Author: Autelitano et al.; Published: May 2021 (Year: 2021).*

(Continued)

*Primary Examiner* — Muhammad Adnan
(74) *Attorney, Agent, or Firm* — SHEPPARD, MULLIN, RICHTER & HAMPTON LLP; Daniel N. Yannuzzi

(57) ABSTRACT

Systems and methods are provided for forming a knowledge hub. According to some embodiments, the methods and systems comprise determining a region of interest comprising a geographical portion of a roadway, determining an appropriate notification associated with the region of interest, the appropriate notification comprising instructions to navigate the geographical portion of the roadway, examining available resources to generate a knowledge hub about the region of interest and notifying the driver of the vehicle of the appropriate notification associated with the region of interest when the vehicle enters into the region of interest.

20 Claims, 9 Drawing Sheets

(56) References Cited

U.S. PATENT DOCUMENTS

| | | | | |
|---|---|---|---|---|
| 11,069,236 | B2 * | 7/2021 | Tonguz | G08G 1/096791 |
| 11,433,892 | B2 * | 9/2022 | Ghafouri | G06V 20/56 |
| 2001/0054970 | A1 * | 12/2001 | Jones | G08G 1/0955 340/471 |
| 2013/0293394 | A1 * | 11/2013 | Rubin | H04L 5/0091 340/902 |
| 2017/0213462 | A1 * | 7/2017 | Prokhorov | G08G 1/166 |
| 2018/0082590 | A1 * | 3/2018 | MacNeille | G08G 1/22 |
| 2018/0329418 | A1 * | 11/2018 | Baalke | G16Z 99/00 |
| 2021/0163008 | A1 * | 6/2021 | Ghafouri | G06N 3/08 |
| 2021/0248906 | A1 * | 8/2021 | Wang | G08G 1/07 |
| 2021/0280054 | A1 * | 9/2021 | Tonguz | G08G 1/005 |
| 2022/0292959 | A1 * | 9/2022 | Rewald | G08G 1/0116 |
| 2023/0038372 | A1 * | 2/2023 | Yu | G05D 1/0295 |
| 2023/0143805 | A1 * | 5/2023 | Baba | G08G 1/16 701/301 |
| 2024/0116480 | A1 * | 4/2024 | Layouni | G08G 1/16 |

OTHER PUBLICATIONS

Köpüklü et al., Driver Anomaly Detection: A Dataset and Contrastive Learning Approach, Computer Science > Computer Vision and Pattern Recognition, [Submitted on Sep. 30, 2020 (v1), last revised Nov. 30, 2020 (this version, v2)], Accepted to IEEE Winter Conference on Applications of Computer Vision (WACV 2021) https://arxiv.org/abs/2009.14660.

* cited by examiner

SYSTEMS AND METHODS TO FORM KNOWLEDGE HUBS FOR SAFETY GUIDELINES

TECHNICAL FIELD

The present disclosure relates generally to systems and methods for forming knowledge hubs at one or more locations. Specifically, some implementations relate to forming dynamic and static knowledge hubs around various regions of interest.

DESCRIPTION OF RELATED ART

Occasionally, driving scenarios exist where driver's do not know how to behave. For example, a driver may not understand how to safely perform a merge maneuver with a plurality of vehicles all traveling uniformly in the same lane. A driver may also not know how to proceed through an atypical intersection. Not knowing how to behave in these scenarios can result in accidents.

BRIEF SUMMARY OF THE DISCLOSURE

In accordance with some embodiments, a system for forming a knowledge hub is provided. The system comprises: a communication circuit configured to exchange communications between the system and an ego vehicle; a memory storing instructions; and one or more processors communicably coupled to the memory. The one or more processors are configured to determine a region of interest comprising a geographical portion of a roadway, determine an appropriate notification associated with the region of interest, examine available resources comprising at least one of: (i) connected vehicles and (ii) roadside equipment to generate a knowledge hub about the region of interest, monitor a location of a vehicle to determine whether the vehicle has entered the region of interest, and notify a driver of the vehicle of the appropriate notification associated with the region of interest when the vehicle enters into the region of interest.

In accordance with some embodiments, a method for knowledge hub formation is provided. The methods comprises determining a region of interest comprising a geographical portion of a roadway, determining an appropriate notification associated with the region of interest, examining available resources comprising at least one of: (i) connected vehicles and (ii) roadside equipment to generate a knowledge hub about the region of interest, monitoring a location of a vehicle to determine whether the vehicle has entered the region of interest, and notifying a driver of the vehicle of the appropriate notification associated with the region of interest when the vehicle enters into the region of interest.

In accordance with some embodiments, a non-transitory machine-readable medium is provided. The non-transitory computer-readable medium includes instructions that when executed by a processor cause the processor to perform operations including determining a region of interest comprising a geographical portion of a roadway, determining an appropriate notification associated with the region of interest, examining available resources comprising at least one of: (i) connected vehicles and (ii) roadside equipment to generate a knowledge hub about the region of interest, monitoring a location of a vehicle to determine whether the vehicle has entered the region of interest, and notifying a driver of the vehicle of the appropriate notification associated with the region of interest when the vehicle enters into the region of interest.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
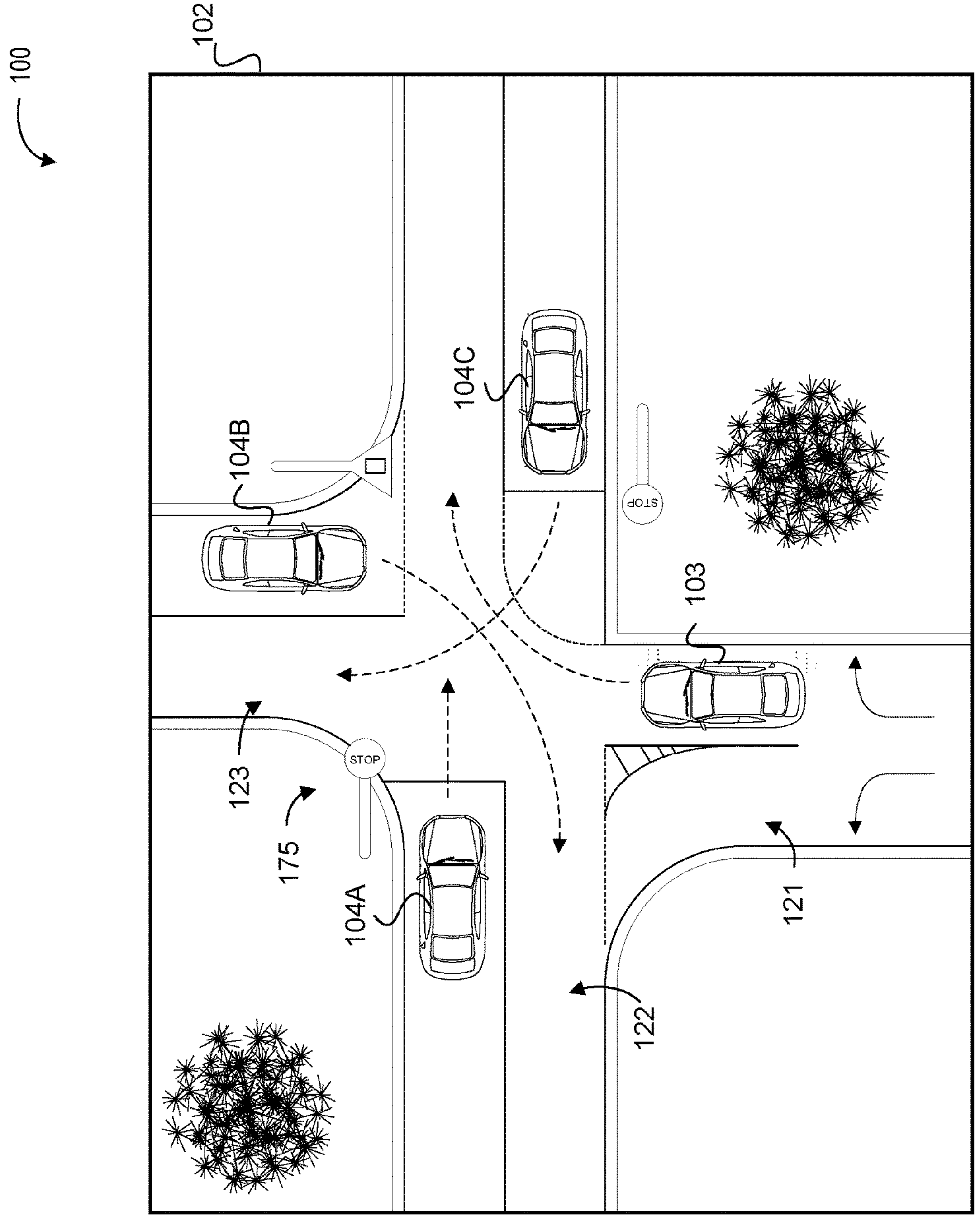
FIG. 1 depicts an example illustration of a vehicle environment, according to one embodiment.

The figures are not exhaustive and do not limit the present disclosure to the precise form disclosed.

DETAILED DESCRIPTION

On occasion, during certain driving environments, drivers may not know how to behave. A driver's behavior can refer generally to actions, reactions, operations, etc. that may be performed or undertaken by a driver while operating a vehicle. At certain points/times while operating a vehicle, traffic conditions, environmental conditions, or the vehicle's condition/operating state may cause or result in a driver not knowing or understanding what action, reaction, driving decision etc., should be performed upon encountering such a condition(s). For example, when a driver enters into a roundabout, or when a driver is attempting to merge into a lane with a platoon of vehicles (i.e., a series of vehicles traveling at roughly the same speed in the same lane at roughly the same intervals), the driver may not know the right-of-way rules associated with the roadway or the traffic pattern.

Current methods to improve vehicle safety typically include providing feedback as the driver engages in an unsafe driving maneuver. However, conventional driver/vehicle safety systems do not proactively warn drivers of the right-of-way rules associated with driving environments, instead, conventional driver/vehicle safety systems merely warn drivers of unsafe driving conditions when the driver attempts to engage in a potentially unsafe driving maneuver. Unlike the embodiments of the various technologies disclosed herein, conventional driver/vehicle safety systems are reactionary-based systems (i.e., systems based on the driver engaging, or attempting to engage in a driving maneuver). For example, if a driver attempts to change lanes and does not see a vehicle in his/her blind spot, a vehicle safety system will notify the driver of the vehicle in his/her blind spot. These conventional driver/vehicle safety systems do not proactively notify the driver of the right-of-way rules associated with each roadway or traffic pattern. For example, conventional driver/vehicle safety features do not notify the driver of the right-of-way rules of a potentially confusing atypical four-way intersection which he/she is approaching. Although reactive feedback methods offer some level of prevention, a predictive system and method could prevent the drivers from engaging in the unsafe driving maneuver altogether.

The knowledge hub system and methods proposed herein, assist drivers by determining roadway features and traffic patterns, and notifying drivers of instructions on how to proceed through/engage with the roadway features and/or traffic patterns. For example, in one embodiment, the knowledge hub system notifies the drivers of the right-of-way rules associated with the each roadway feature or traffic pattern. By notifying drivers of the right-of-way rules, the knowledge hub system can assist drivers in their driving decisions, thus increasing driver and passenger and situational awareness during potentially uncertain driving events. Each roadway feature or traffic pattern is identified as a region of interest (ROI) that may necessitate driver assistance. The ROI is a virtual representation of an area of geographical concern in the physical world (i.e., a physical region defined virtually). The ROI is defined by a radius of Z from a center-point about the roadway feature or traffic pattern. When the ego vehicle approaches the ROI, the driver is notified of the right-of-way rules associated with the ROI.

The ROI can include a static ROI or a dynamic ROI. For example, a Static ROI comprising a roundabout, or a dynamic ROI comprising a platoon of vehicles comprising two or more vehicles traveling in the same lane at roughly the same speed. The "static" ROI is a ROI that includes an immovable roadway feature. An immovable roadway feature is a feature of the roadway that is stationary. For example, a roundabout, an offset four-way intersection, a six way intersection, an intersection with one or more yield signs, toll gates, parking lots, an intersection without electricity (i.e., without working traffic signals) etc. The "dynamic" ROI is a ROI that includes a moveable roadway feature. A moveable roadway feature is any feature that is actively moving, or can be moved at any point in time while the vehicle is traveling. For example, a platoon of vehicles, a school bus, a garbage truck, a commercial truck, a traffic jam with a plurality of vehicles, etc. In one embodiment, the dynamic ROI includes a traffic pattern.

In one embodiment, the knowledge hub system includes a knowledge hub circuit hosted on a cloud server. The cloud server communicates wirelessly with the vehicle via one or wireless methods of communication. The wireless methods of communication include vehicle to everything (V2X) methods of communication. The V2X methods of communication include vehicle to cloud (V2C), cloud to vehicle (C2V), vehicle to vehicle (V2V), and vehicle to infrastructure (V2I) methods of communication.

Data comprising the geographic position (i.e., location) of the vehicle is captured by one or more vehicle sensors and sent to the cloud server via the V2X communication methods. For example, data captured by an ego vehicle can be transmitted between the cloud server and the vehicle via vehicle to cloud (V2C), cloud to vehicle (C2V), vehicle to vehicle communication (V2V), and vehicle to infrastructure (V2I) methods.

In one embodiment, the cloud server receives data captured by one or more vehicle sensors. The cloud server uses the vehicle sensor data to determine whether the ego vehicle is approaching a dynamic ROI or static ROI. If the ego vehicle is approaching a static ROI, the knowledge hub system can notify the driver of the right-of-way rules associated with the static ROI. If the ego vehicle is approaching a dynamic ROI, the knowledge hub system can notify the driver of the right-of-way rules associated with the dynamic ROI. In one embodiment, the cloud server uses data captured by one or more vehicle sensors to determine the proximate location of one or more vehicles. By determining the proximate location of one or more vehicles the knowledge hub system can determine whether a set of vehicles forms a dynamic ROI (i.e., a platoon of vehicles). If the knowledge hub system determines that a dynamic ROI exists, the knowledge hub system notifies the driver of the right-of-way rules associated with the traffic pattern in the dynamic ROI.

In one embodiment, the knowledge hub system includes a knowledge hub circuit disposed within the vehicle. The knowledge hub circuit communicates through wired or wireless communication methods with various vehicle systems and vehicle sensors within the vehicle. The vehicle sensors and vehicle systems capture data comprising the vehicle's location and roadway environment. The data is used by the knowledge hub circuit to determine whether the vehicle is approaching a static ROI or dynamic ROI. When the knowledge hub circuit determines that the vehicle is approaching the static ROI or dynamic ROI, the knowledge hub system uses one or more vehicle systems to notify the driver of the right-of-way rules associated with the respective ROI. The driver is notified of the right-of-way rules for the ROI via a plurality of in-vehicle notification systems and methods (i.e., a heads-up display, an audible alarm, a navigation screen etc.).

For example, when the ego vehicle approaches a roundabout intersection (i.e., a static ROI), the knowledge hub system notifies the driver of the ego vehicle the right-of-way rules for navigating the roundabout intersection. By notifying the driver of the right-of-way rules for a roundabout intersection, the driver may make various driving decision to appropriately navigate the roundabout.

For example, when the ego vehicle approaches and engages/interacts with a platoon of vehicles (i.e., a dynamic ROI), the knowledge hub system notifies the driver of the ego vehicle the right-of-way rules for merging into a platoon of vehicle. By notifying the driver of the right-of-way rules for merging into a lane with a platoon of vehicles, the driver may make various decisions to appropriately merge lanes.

FIG. 1 is a schematic diagram of an example environment 102 in which a knowledge hub system 100 can be implemented. The example operating environment 102 includes an ego vehicle 103, and one or more vehicles 104A-104C, at an atypical four-way intersection. The atypical intersection is an any intersection that includes roadway features that may cause driver confusion. The roadway features can be any type of traffic signals, roadway patterns, roadway hazards etc. that may cause a driver to become confused as to how to proceed through the intersection. For example, in one embodiment, the atypical intersection can include the intersection of FIG. 1. In another example, in one embodiment, the atypical intersection can include an intersection with no-electricity (a traffic signal outage). The atypical four-way intersection of FIG. 1 includes a first roadway 121, a second roadway 122 and a third roadway 123. The first roadway 121 and the third roadway 123 intersect the second roadway 122 at different points, creating an offset intersection 175.

The plurality of vehicles includes the ego vehicle 103 and vehicles 104A-104C. Vehicles 104A-104C may each provide similar functionality to the ego vehicle 103. Ego vehicle 103 may be any type of vehicle. For example, ego vehicle 103 may be a car; a truck; a sports utility vehicle; a bus; a semi-truck; a drone or any other roadway-based conveyance.

When the driver of the ego vehicle 103 approaches the atypical intersection comprising an offset intersection 175, he or she may not know/remember the standard operating procedures of that intersection (i.e., he or she may not know the rules of the road). Moreover, given the presence of one or more vehicles 104A-104C, the driver may not know/remember which vehicle has the right of way. An atypical intersection can be any intersection that includes roadway features not found in a typical roadway. For purposes of this disclosure "atypical" is defined as an intersection including roadway features that may cause confusion to a driver. For example, as seen in FIG. 1 the roadway includes an offset intersection comprising multiple roadways. The roadway features comprising turn lanes, stop signs, yield signs etc., can be confusing to a driver. It is understood that every intersection could cause confusion to a driver. Accordingly the systems and methods of the disclosure could be applied to each and every intersection, and should not be inferred as being limited to a specific type of intersection. It is foreseeable that in some embodiments, the knowledge hub system 100 can notify the driver of the right-of-way rules associated with every intersection (i.e., static ROI 101B). As seen in FIG. 1, the atypical four-way intersection includes an intersection of a first roadway 121 with a second roadway 122 and third roadway 123. Each roadway includes an imaginary centerline (not shown). The imaginary centerline of the first roadway 121 terminates at the intersection of the first roadway 121 and the second roadway 122. The imaginary centerline of the first roadway 121 does not match the imaginary center line of the third roadway 123.

The knowledge hub system 100 assists drivers during various traffic patterns (i.e., difficult or potentially hazardous driving environments), by notifying the drivers of the right-of-way rules associated with the roadways or traffic patterns. By notifying driver of the right-of-way rules, the knowledge hub system 100 can provide the driver with instructions on how to proceed, before the driver engages with the roadway. In one embodiment, the right-of-way rules associated with the roadways or traffics are transmitted to the drivers of the ego vehicle as instructions as to how to proceed through the roadways or traffic patterns. The instructions can be transmitted to the drivers in a variety of different ways. For example, in one embodiment, a driver feedback circuit can be implemented to provide visual and audible instructions to the driver. In one embodiment, the knowledge hub system 100 includes a remote knowledge hub circuit 310 hosted on a cloud server 405. The ego vehicle 103 communicates with a cloud server 405 via a plurality of vehicle to everything (V2X) communication methods. The cloud server 405 can monitor the position of the ego vehicle 103 and determine whether the ego vehicle 103 is approaching a static ROI 101A or dynamic ROI 101B. If the cloud server 405 determines that the ego vehicle 103 is approaching a respective ROI, the cloud server 405 uses V2X communication methods to transmit the right-of-way rules associated the respective ROI. Once the vehicle receives the right-of-way rules, the driver can be notified of the right-of-way rules via a display, instrument panel, haptic feedback, audio, etc.

As seen in FIG. 1, the roadway includes a static ROI 101A comprising an offset four-way intersection. When the ego vehicle 103 enters/approaches the ROI, the knowledge hub system 100 notifies the driver of the right-of-way rules associated with the roadway feature. In one embodiment, the driver of the ego vehicle 103 is notified of the right-of-way rules before the ego vehicle enters the ROI. In one embodiment, the driver of the ego vehicle 103 is notified of the right-of-way rules as the ego vehicle enters the ROI. Moreover, the distance at which the driver of the ego vehicle is notified of the right-of-way rules is fluid and can change depending on the level of granularity in which the knowledge hub system 100 is implemented.

In one embodiment, the static ROI 101A is determined by a processor 306 in the knowledge hub circuit 310 and stored in memory 308. The knowledge hub circuit 310 can also determine a dynamic ROI using one or more connected vehicles in a traffic pattern. The one or more connected vehicles can include vehicles 104A-104C. For example, the knowledge hub circuit 310 can use vehicle data received from one or more connected vehicles to determine a type of traffic pattern. If the knowledge hub circuit 310 determines that the one or more connected vehicles form a type of traffic pattern, then the knowledge hub system 100 can notify the driver of the appropriate right-of-way rules for the traffic pattern.

Data used to determine a static ROI 101A or dynamic ROI 101B can be captured by one or more sensors in the ego vehicle, or by one or more connected vehicles in the traffic formation. For example, in one embodiment, data can be captured by one or more infrared sensors located within the ego vehicle. The infrared sensors can capture data that is used by the cloud server to determine whether a specific traffic formation exists. In another embodiment, each connected vehicle in the traffic formation is monitored by the cloud server 405. When the cloud server 405 determines that one or more connected vehicle are in a traffic pattern (i.e., a dynamic ROI) within a proximity of the ego vehicle, the cloud server can send the right-of-way rules to the ego vehicle using V2X communication. The cloud server 405 can further use V2X communication to monitor the location of the ego vehicle and determine when the ego vehicle enters/approaches into the ROI. The driver can be notified at a distance outside of the boundary of the ROI, or once the driver has crossed the ROI.

V2X communication includes V2I, V2C, C2V and V2V communication. For example, in one embodiment, the knowledge hub can be created using V2V. V2V communication is used to generate dynamic regions of concern that can overlap with static regions of concern. For example, V2V communication may be used to generate a dynamic region of concern around a 4 way intersection where each vehicle at the intersection is engaging in an indecisive driving maneuver.

As used herein, "connected vehicle" refers to a vehicle that is actively connected to edge devices, other vehicles, and/or a cloud server via a network through V2X communication comprising V2I, V2C, C2V and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

As used herein, the words "geographic location," "location," "geographic position" and "position" refer to a latitude and longitude of an object (or, a latitude, longitude, and elevation of an object), such as a connected vehicle, an RSE, a client device, etc. As used herein, the words "geographic area", and "area," refer to a physical space surrounding a geographic location (e.g., an area of defined space surrounding a geographic location or position).

Figure 2:
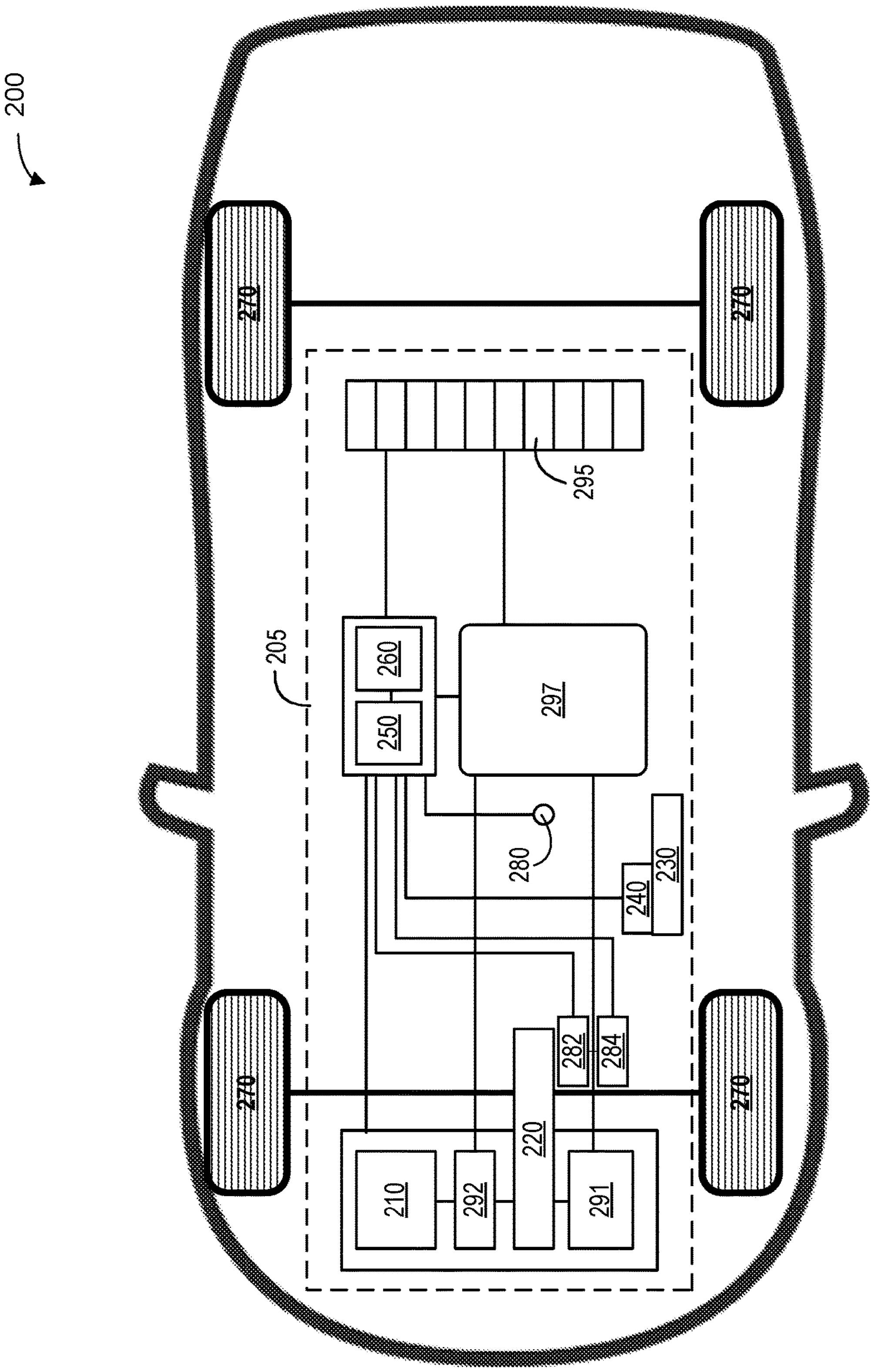
FIG. 2 depicts an example vehicle in which the systems and methods disclosed herein may be applied.

FIG. 2 illustrates an example hybrid electric vehicle (HEV) 200 in which various embodiments for autonomous and semi-autonomous steering alterations based on a driver profile may be implemented. For example, in one embodiment, the ego vehicle 103 is a HEV 200. It should be understood that various embodiments disclosed herein may be applicable to/used in various vehicles (internal combustion engine (ICE) vehicles, fully electric vehicles (EVs), etc.) that are fully or partially autonomously controlled/operated, and not solely HEVs.

Here, HEV 200 includes drive force unit 205 and wheels 270. Drive force unit 205 includes an engine 210, motor generators (MGs) 291 and 292, a battery 295, an inverter 297, a brake pedal 230, a brake pedal sensor 240, a transmission 220, a memory 260, an electronic control unit (ECU) 250, a shifter 280, a speed sensor 282, and an accelerometer 284.

Engine 210 primarily drives the wheels 270. Engine 210 can be an ICE that combusts fuel, such as gasoline, ethanol, diesel, biofuel, or other types of fuels which are suitable for combustion. The torque output by engine 210 is received by the transmission 220. MGs 291 and 292 can also output torque to the transmission 220. Engine 210 and MGs 291 and 292 may be coupled through a planetary gear (not shown in FIG. 2). The transmission 220 delivers an applied torque to the wheels 270. The torque output by engine 210 does not directly translate into the applied torque to the wheels 270.

MGs 291 and 292 can serve as motors which output torque in a drive mode, and can serve as generators to recharge the battery 295 in a regeneration mode. The electric power delivered from or to MGs 291 and 292 passes through inverter 297 to battery 295. Brake pedal sensor 240 can detect pressure applied to brake pedal 230, which may further affect the applied torque to wheels 270. Speed sensor 282 is connected to an output shaft of transmission 220 to detect a speed input which is converted into a vehicle speed by ECU 250. Accelerometer 284 is connected to the body of HEV 200 to detect the actual deceleration of HEV 200, which corresponds to a deceleration torque.

Transmission 220 is a transmission suitable for an HEV. For example, transmission 220 can be an electronically controlled continuously variable transmission (ECVT), which is coupled to engine 210 as well as to MGs 291 and 292. Transmission 220 can deliver torque output from a combination of engine 210 and MGs 291 and 292. The ECU 250 controls the transmission 220, utilizing data stored in memory 260 to determine the applied torque delivered to the wheels 270. For example, ECU 250 may determine that at a certain vehicle speed, engine 210 should provide a fraction of the applied torque to the wheels while MG 291 provides most of the applied torque. ECU 250 and transmission 220 can control an engine speed (N E) of engine 210 independently of the vehicle speed (V).

ECU 250 may include circuitry to control the above aspects of vehicle operation. ECU 250 may include, for example, a microcomputer that includes a one or more processing units (e.g., microprocessors), memory storage (e.g., RAM, ROM, etc.), and I/O devices. ECU 250 may execute instructions stored in memory to control one or more electrical systems or subsystems in the vehicle. ECU 250 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 291 and 292 each may be a permanent magnet type synchronous motor including for example, a rotor with a permanent magnet embedded therein. MGs 291 and 292 may each be driven by an inverter controlled by a control signal from ECU 250 so as to convert direct current (DC) power from battery 295 to alternating current (AC) power, and supply the AC power to MGs 291, 292. MG 292 may be driven by electric power generated by motor generator MG 291. It should be understood that in embodiments where MG 291 and MG 292 are DC motors, no inverter is required. The inverter, in conjunction with a converter assembly may also accept power from one or more of MGs 291, 292 (e.g., during engine charging), convert this power from AC back to DC, and use this power to charge battery 295 (hence the name, motor generator). ECU 250 may control the inverter, adjust driving current supplied to MG 292, and adjust the current received from MG 291 during regenerative coasting and braking.

Battery 295 may be implemented as one or more batteries or other power storage devices including, for example, lead-acid batteries, lithium ion, and nickel batteries, capacitive storage devices, and so on. Battery 295 may also be charged by one or more of MGs 291, 292, such as, for example, by regenerative braking or by coasting during which one or more of MGs 291, 292 operates as generator. Alternatively (or additionally, battery 295 can be charged by MG 291, for example, when HEV 200 is in idle (not moving/not in drive). Further still, battery 295 may be charged by a battery charger (not shown) that receives energy from engine 210. The battery charger may be switched or otherwise controlled to engage/disengage it with battery 295. For example, an alternator or generator may be coupled directly or indirectly to a drive shaft of engine 210 to generate an electrical current as a result of the operation of engine 210. Still other embodiments contemplate the use of one or more additional motor generators to power the rear wheels of a vehicle (e.g., in vehicles equipped with 4-Wheel Drive), or using two rear motor generators, each powering a rear wheel.

Battery 295 may also be used to power other electrical or electronic systems in the vehicle. Battery 295 can include, for example, one or more batteries, capacitive storage units, or other storage reservoirs suitable for storing electrical energy that can be used to power MG 291 and/or MG 292. When battery 295 is implemented using one or more batteries, the batteries can include, for example, nickel metal hydride batteries, lithium ion batteries, lead acid batteries, nickel cadmium batteries, lithium ion polymer batteries, and other types of batteries.

Figure 3:
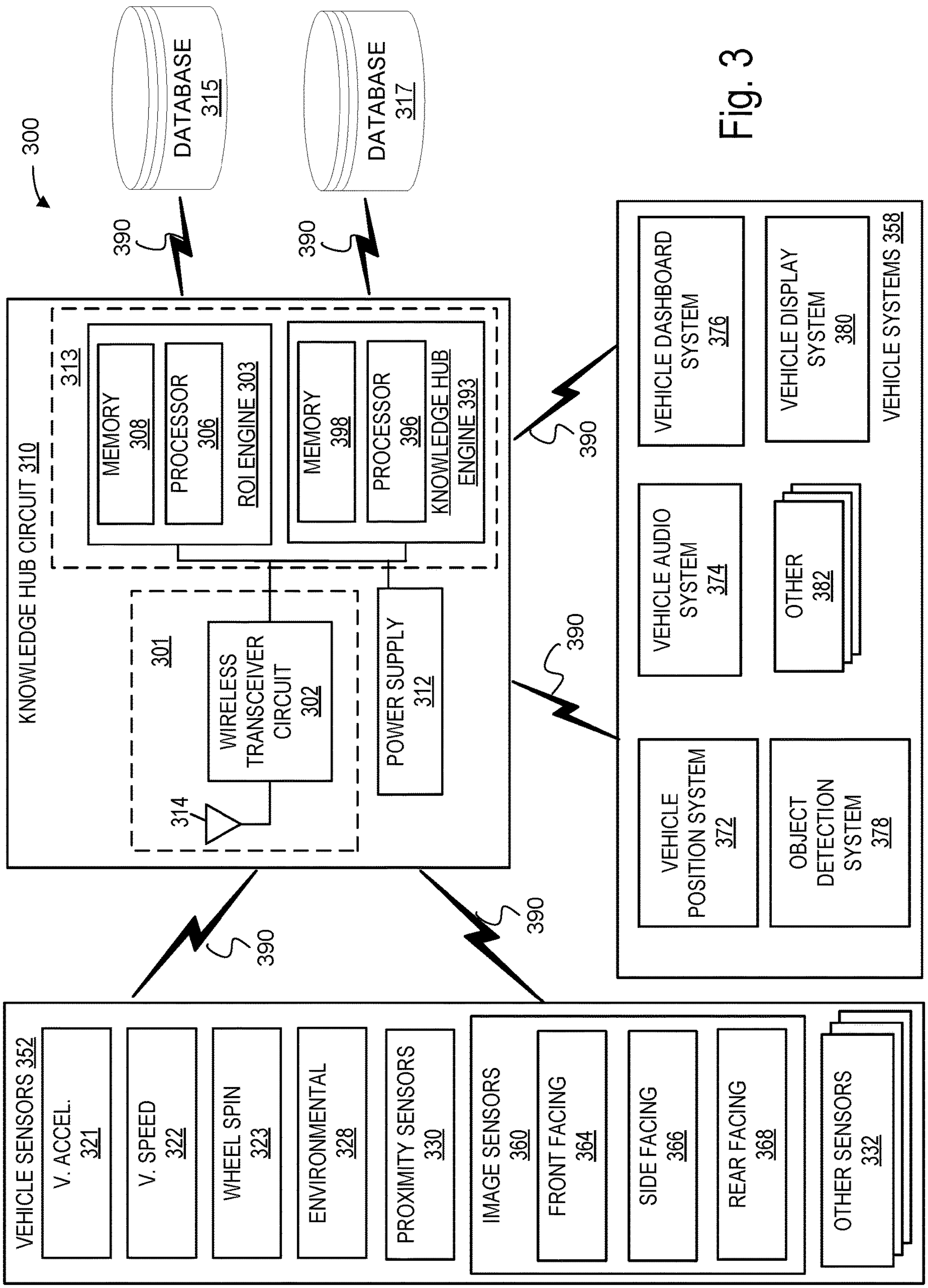
FIG. 3 depicts an example network architecture of an in-vehicle knowledge hub system, according to one embodiment.

FIG. 3 illustrates an example of a knowledge hub system 300 in an ego vehicle in accordance with one embodiment of the systems and methods described herein. The knowledge hub system 300 includes a knowledge hub circuit 310 communicatively connected to a plurality of sensors 352, a plurality of vehicle systems 358, a database 315 comprising roadway data, and a database 317 comprising right-of-way rules. Sensors 352 and vehicle systems 358 wirelessly communicate with the knowledge hub circuit 310. Although in this example sensors 352 and vehicle systems 358 are depicted as communicating with vehicular knowledge hub circuit 310, they can also communicate with each other as well as with other vehicle systems. The knowledge hub circuit 310 can be implemented as an ECU or as part of an ECU. In other embodiments, the knowledge hub circuit 310 can be implemented independently of the ECU.

The knowledge hub circuit 310 in this example includes a communication circuit 301, a decision circuit 313 comprising a ROI engine 303, and a knowledge hub engine 393, and a power supply 312. Each engine includes a respective processor 306, 396 and respective memory 308. 396. For example, the ROI engine 303 includes a processor 306, and a memory 308, and the Knowledge hub engine 393 includes a processor 396 and a memory 398.

Processor 306 can include one or more GPUs, CPUs, microprocessors, or any other suitable processing system. Processor 306 may include a single core or multicore processors. The memory 308 may include one or more various forms of memory or data storage (e.g., flash, RAM, etc.) that may be used to store instructions and variables for processor 306 as well as any other suitable information, such as, one or more of the following elements: rules data; resource data; GPS data; and base data, as described below. Memory 308 can be made up of one or more modules of one or more different types of memory, and may be configured to store data and other information as well as operational instructions that may be used by the processors 306 and 396.

Although the example of FIG. 3 is illustrated using processor and memory circuitry, as described below with reference to circuits disclosed herein, decision circuit 313 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the knowledge hub circuit 310.

Communication circuit 301 includes either or both a wireless transceiver circuit 302 with an associated antenna 314 and a wired I/O interface with an associated hardwired data port (not illustrated). Communication circuit 301 can provide for V2X communications capabilities, allowing the knowledge hub circuit 310 to communicate with edge devices, such as roadside equipment (RSE), network cloud servers and cloud-based databases, and/or other vehicles.

As this example illustrates, communications with the knowledge hub circuit 310 can include either or both wired and wireless communications circuits 301. Wireless transceiver circuit 302 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by the knowledge hub circuit 310 to/from other entities such as sensors 352 and vehicle systems 358.

Power supply 312 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

In the illustrated example, sensors 352 include vehicle acceleration sensors 321, vehicle speed sensors 322, wheelspin sensors 323 (e.g., one for each wheel), environmental sensors 328 (e.g., to detect salinity or other environmental conditions), proximity sensor 330 (e.g., sonar, radar, lidar or other vehicle proximity sensors), and image sensors 360. Additional sensors (i.e., other sensors 332) can be included as may be appropriate for a given implementation of knowledge hub system 300.

The sensors 352 include front facing image sensors 364, side facing image sensors 366, and/or rear facing image sensors 368. Image sensors may capture information which may be used in detecting not only vehicle conditions but also detecting conditions external to the ego vehicle 103 as well. Image sensors that might be used to detect external conditions can include, for example, cameras or other image sensors configured to capture data in the form of sequential image frames forming a video in the visible spectrum, near infra-red (IR) spectrum, IR spectrum, ultra violet spectrum, etc. Image sensors 360 can be used to, for example, to detect objects in an environment surrounding ego vehicle 103, for example, traffic signs indicating a current speed limit, road curvature, obstacles, surrounding vehicles, and so on. For example, one or more image sensors 360 may capture images of neighboring vehicles in the surrounding environment. As another example, object detecting and recognition techniques may be used to detect objects and environmental conditions, such as, but not limited to, road conditions, surrounding vehicle behavior (e.g., driving behavior and the like), parking availability, etc. Additionally, sensors may estimate proximity between vehicles. For instance, the image sensors 360 may include cameras that may be used with and/or integrated with other proximity sensors 330 such as LIDAR sensors or any other sensors capable of capturing a distance. As used herein, a sensor set of a vehicle may refer to sensors 352 and image sensors 360 as a set.

Vehicle systems 358 include any of a number of different vehicle components or subsystems used to control or monitor various aspects of the vehicle and its performance. In this example, the vehicle systems 358 includes a vehicle positioning system 372; vehicle audio system 374 comprising one or more speakers configured to deliver audio throughout the vehicle; object detection system 378 to perform image processing such as object recognition and detection on images from image sensors 360, proximity estimation, for example, from image sensors 360 and/or proximity sensors, etc. for use in other vehicle systems; suspension system 380 such as, for example, an adjustable-height air suspension system, or an adjustable-damping suspension system; and other vehicle systems 382 (e.g., (e.g., Advanced Driver- Assistance Systems (ADAS), such as forward/rear collision detection and warning systems, pedestrian detection systems, autonomous or semi-autonomous driving systems, and the like).

The vehicle positioning system 372 includes a global positioning system (GPS). Ego vehicle 103 and the one or more connected vehicles 104 may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy.

As used herein, the words "geographic location," "location," "geographic position" and "position" refer to a latitude and longitude of an object (or, a latitude, longitude, and elevation of an object), such as a connected vehicle, an RSE, a client device, etc. As used herein, the words "geographic area", and "area," refer to a physical space surrounding a location (e.g., an area of defined space surrounding a geographic location or geographic position). The example embodiments described herein may provide positioning information that describes a geographic position of a vehicle with an accuracy of one or more of: (1) at least plus or minus 1.5 meters in relation to the actual geographic position of the vehicle in two dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Network 390 may be a conventional type of network, wired or wireless, and may have numerous different configurations including a star configuration, token ring configuration, or other configurations. Furthermore, the network 390 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 390 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 390 may include one or more IEEE 802.11 wireless networks.

In one embodiment, data comprising the location of vehicle is captured by the vehicle position system 358. The vehicle position system 358 can include one or more sensors 352 configured to capture vehicle position data. The vehicle positioning system 372 communicates with the knowledge hub circuit 310 to determine whether the ego vehicle 103 is within a set distance of the ROI. The knowledge hub system 100 uses the data to determine the location (i.e., proximity) of the ego vehicle 103 to the static ROI 101A. For example, vehicle position data is sent to and received by the knowledge hub system 100. The knowledge hub system 100 uses the vehicle position data to determine the proximity of the vehicle to a dynamic ROI 101B or static ROI 101A.

The "set distance" of the ROI comprises a range of distances at which the knowledge hub notifies the driver of the right-of-way rules associates with each type of static ROI 101A. In one embodiment, the "set distance" of the ROI includes a distance sufficient to allow the driver to engage in a driving maneuver before the driver enters into the static ROI 101A comprising a roadway feature. The distance sufficient to allow the driver to engage in a driving maneuver can include a range of distances from about 5 feet to about 50 feet, or about 10 feet, or about 15 feet, or about 20 feet, or about 25 feet, or about 30 feet, or about 35 feet, or about 40 feet, or about 45 feet measured from a center point of the static ROI 101A to a center point of the ego vehicle.

The knowledge hub circuit 310 receives roadway data from database 315. The roadway data includes maps of roadways and roadway features. The knowledge hub circuit 310 receives right-of-way rules from database 317.

The cloud server 405 is in communication with both database 315 and database 317. Database 315 sends roadway data to the ROI engine 303. Roadway data is received by the ROI engine 303 and used by processor 306 to determine ROI. Each ROI is stored in memory 308. Database 317 sends right-of-way data comprising instruction on how to proceed at each roadway feature to the database the knowledge hub engine 393. Right of way data is received by the processor 396 and stored in memory 398. The right of way data and the roadway data are used by the knowledge hub circuit to generate a knowledge hub for each ROI. When the ego vehicle enters a ROI, the knowledge hub circuit sends right-of-way instructions to the driver to inform the driver via one or more notification methods.

The ROI engine 303 receives data comprising roadway information from database 315. The processor 306 determines whether a static ROI 101A exists in the roadway and stores the location of the static ROI in memory 308. For example, the ROI engine 303 uses data of roadways and the roadway features to determine the ROI. The knowledge hub engine 393 assigns a right-of-way rule for each ROI. For example, at intersections without "STOP" or "YIELD" signs, the display can include slow down and be ready to stop. Yield to traffic and pedestrians already in the intersection or just entering the intersection. Also yield to the vehicle or bicycle that arrives first, or to the vehicle or bicycle on your right if it reaches the intersection at the same time as you. For example, at a roundabout, enter the roundabout when this a big enough gap in traffic to merge safely. Travel in a counter-clockwise direction and do not stop or pass. Signal when you change lanes or exit the roundabout. If you miss your exit, continue around until you return to your exit. For example, at a railway, the speed limit is 15 mph within 100 feet of a railroad crossing where you cannot see the tracks for 400 feet in both direction. You may drive faster than 15 mph if the crossing is controlled by gates, a warning signal, or a flagman. A flashing red traffic signal light means "STOP". If a flashing red traffic signal light is present, stop at least 15 feet, but no more than 50 feet, from the nearest track when the crossing devices are active.

Once the knowledge hub system 100 determines that the ego vehicle is approaching the static ROI 101A, the knowledge hub system 100 notifies the driver using one or more notification methods. In one embodiment, the notification methods include the vehicle systems 358 comprising the vehicle audio system 372 and the vehicle dashboard system 376. The notification methods includes visual and/or audible methods of informing the driver of the right-of-way rules associated with the ROI. In one embodiment, the notification methods include notifying the driver of the ego vehicle 103 via one or more vehicle systems 358. For example, in one embodiment, the driver is notified of the right-of-way rules via the vehicle audio system 374 (e.g., instructions played/broadcasted over one or more vehicle speakers), the vehicle display system 380 and/or the vehicle dashboard system 376. In one embodiment, the driver is notified of the right-of-way rules associated with each respective ROI by a navigation system within the instrument cluster and the dashboard GUI. The notification can include visual instructions (e.g., visual directions on how to proceed), and/or auditory instructions (e.g., verbal commands from the knowledge hub system 100 to the driver).

Figure 4:
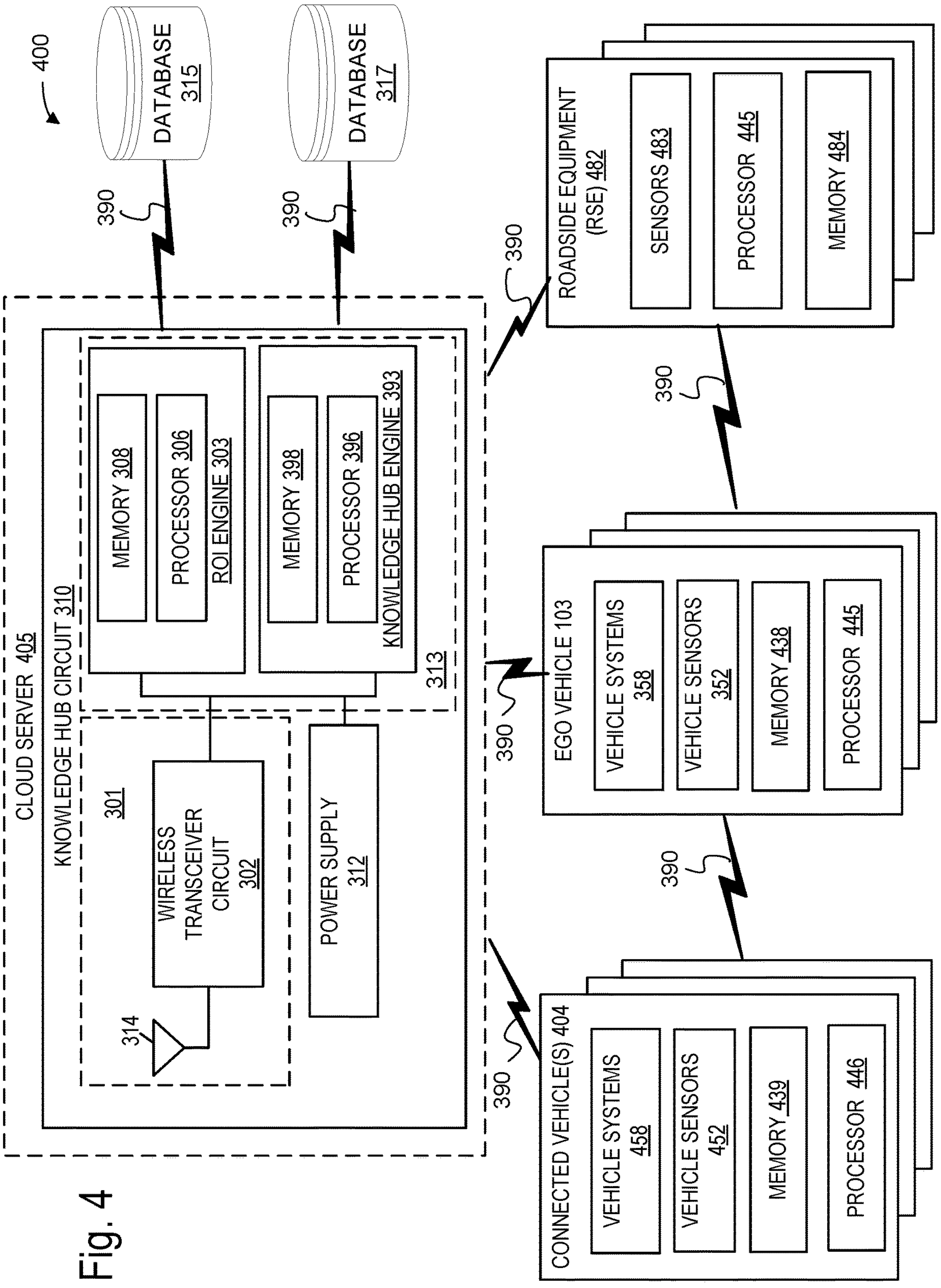
FIG. 4 depicts an example network architecture of a remote knowledge hub system, according to one embodiment.

FIG. 4 is an example V2X network architecture 400 of the knowledge hub system 100 in accordance with various embodiments disclosed herein. The network architecture 400 includes the cloud server 405 comprising a knowledge hub circuit 310, a connected vehicle 404 (e.g., vehicles 104A-104C), the ego vehicle 103 and a roadside equipment (RSE) 482 infrastructure component of a roadway. RSE 482 includes sensors 483, a processor 445 and memory 484. The sensors 483, processor 445 and memory 484 can include sensors same as/similar to vehicle sensors 352, processor 306, processor 396, memory 308 or memory 396. The cloud server 405, connected vehicle 404 and ego vehicle 103 and RSE 482 can all communicate with one another. For example, connected vehicle 404 can communicate with the ego vehicle 103, and the ego vehicle 103 can communicate with the RSE 482. In some embodiments, connected vehicle 404 includes a communication circuitry comprising hardware and software that is needed to enable the connected vehicle 404 to communicate with the ego vehicle 103, RSE 482 and/or cloud server 405 via network 390. The ego vehicle is also a "connected vehicle", but for explanation purposes is referred to as the "ego vehicle". In one embodiment, the connected vehicle 104 includes the same or similar vehicle systems and sensors as the ego vehicle. Using one or more sensors and/or vehicle systems, the connected vehicle 104 can collaborate on the task of providing a precise location of the ego vehicle 103 by leveraging their respective sensor sets (e.g., sensors 352, systems 358, and/or image sensors 360 of FIG. 3).

In one embodiment, data comprising the ego vehicle 103 location is received by the knowledge hub circuit 310 via one or more V2X communication methods (e.g., V2I communication with RSE 482, V2C/C2V communication with the cloud server 405, and/or V2V communication with one or more connected vehicles 104). The location of the ego vehicle 103 can be determined by one or more connected vehicles 104 or RSE units. The location of the ego vehicle 103 can be transmitted from the one or more connected vehicle 104 or RSE units to the cloud server 405 to the vehicle via one or more V2X communication methods. In one embodiment, the V2I communication method includes ego vehicle 103 communication to the cloud server 405 via RSE 482. The vehicle's position can be determined using the RSE 482. The RSE 482 is in communication with the cloud server 305. For example, RSE can receive data comprising the location of the ego vehicle 103, and communicate the data to cloud server 305 via network 390. Inversely, the cloud server 305 can communicate with either directly with the ego vehicle via a C2V communication method or to the RSE, which can subsequently relay the data from the cloud server 305 to the ego vehicle 103. In one embodiment, the V2V communication method includes ego vehicle 103 communication with one or more connected vehicles 104A-104C. The one or more connected vehicles 104A-104C can communicate with the ego vehicle 103. In one embodiment, the one or more connected vehicles 104A-104C relay data from the cloud server 405 to the ego vehicle 103. In one embodiment, the one or more connected vehicles 104A-104C relay data from the ego vehicle 103 to the cloud server 405. In addition, when the one or more connected vehicles 104A-104C are within a proximity to other vehicles, they can create a local network and exchange data with the ego vehicle 103.

As used herein, "connected vehicle" refers to a vehicle that is actively connected to edge devices, other vehicles, and/or a cloud server via a network through V2X communication comprising V2I, V2C, C2V and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

The V2X network is a communication network that enables entities such as elements of the operating environment to wirelessly communicate with one another via one or more of the following: Wi-Fi; cellular communication including 3G, 4G, LTE, 5G, etc.; Dedicated Short Range Communication (DSRC); millimeter wave communication; etc. The V2X includes V2I, V2C, C2V and/or V2V communications.

For example, connected vehicle 404 and ego vehicle 103 may have V2X communication capabilities, allowing vehicle 404 to communicate with RSE 482. For example, RSE 482 may be a vehicle-to-infrastructure (V2I)-enabled street light or camera. Connected vehicle 404 and ego vehicle 103 may also communicate with other connected vehicle 404 over vehicle-to-vehicle (V2V) communications.

In one embodiment, data is received by the ego vehicle 103 from one or more connected vehicles 104 and/or RSE 482 via one or more V2X communication methods (e.g., V2I communication with RSE 482, V2C/C2V communication with the cloud server 405, and/or V2V communication with one or more connected vehicles 104. For example, in one embodiment roadway data can be transmitted from the one or more connected vehicles 104 to the ego vehicle 103. Furthermore, in one embodiment, roadway data can be transmitted from ego vehicle 103 to the cloud server directly via V2C or C2V communication methods or via the RSE 482 as a relay to the cloud via V2I communication methods.

It should be understood that sometimes, a vehicle itself may act as a network node or edge computing device. For example, connected vehicle 404 may be a network edge device. The data gathered by the connected vehicle 404, either through their own sensors, or other data sources, 404, e.g., RSE 482 and other vehicles, may be ultimately be transmitted to the cloud, e.g., the cloud server 405 and cloud-based memory 308 via network 390.

Cloud server 405 may be an edge server or a cloud server. The cloud server 405 can communicate with RSE 482, connected vehicle 404 and/or ego vehicle 103. The cloud server 405 may be one or more cloud-based instance of processor-based computing device residents communicatively connected to database 315, database 317, RSE 482, ego vehicle 103 and/or connected vehicle 404. The cloud server 405 may include circuitry to control various aspects of the knowledge hub system 100 described herein. Cloud server 405 may include, for example, a microcomputer that includes a one or more processing units (e.g., microprocessors), memory storage (e.g., RAM, ROM, etc.), and I/O devices. As seen in FIG. 4, the cloud server 405 includes a knowledge hub engine 393 comprising a memory 398 and a processor 396. The processor 396 is configured to execute instructions stored in memory 398. The instruction stored in memory 398 include right-of-way rules associated with respective ROIs. The cloud server 405 further includes a ROI engine 303 comprising a memory 308 and a processor 306. The processor 306 is configured to execute instructions stored in memory 308. The instructions stored in memory 308 include instructions to determine one or more static ROIs and/or one or more dynamic ROIs.

In one configuration the vehicle position data, ROI data and right-of-way rules data can be communicated via V2V communications using vehicular micro cloud communication. Additional details related to forming vehicular micro clouds are described in U.S. Pat. No. 10,587,998 B2 the disclosure of which is incorporated herein by reference in its entirety. A vehicular micro cloud is formed when a client device, seeking collaborative execution of an operational task, sends a request to form a vehicular micro cloud to the cloud server 405. The request includes formation rules identifying a target location and information defining the task to be executed in the vehicular micro cloud. The cloud server 405 selects a location within the target location and triggers formation of at least one vehicular micro cloud at the geographic location. The vehicular micro cloud encompasses a defined physical area surrounding the geographic location. The area may be pre-defined by the cloud server 405 and/or defined by the client device as part of the request. The cloud server 405 sets the client device as the micro cloud leader. The cloud server 405 adds any RSE (e.g., RSE 482) as a cloud member and detects connected vehicles (e.g., ego vehicle 103) that are within or pass through the area. The connected vehicles may be detected based on GPS coordinates communicated to cloud server 405. In some embodiments, cloud member capabilities may be leveraged by the cloud server 405 to detect vehicles within the area (e.g., via an image sensor or other sensor of the sensor set). The micro cloud members can then share resources and capabilities to collaborate on the task, included in the request, by transmitting resource data to the cloud server 405. For example, micro cloud members may share resource data including, but not limited to, image frames and/or video feeds from image sensors, image processing results from image frames and/or video frames, object detection results from proximity sensors, GPS coordinates, computation results from subsystems processing data received from sensor sets. Resource data can be aggregated together to provide collaborative results relevant to the requested task. In some embodiments, aggregation of the sensor data may be performed at the cloud server 405, while in other embodiments aggregation may be performed at the client device.

The vehicular micro cloud formation system includes software that is operable, when executed by the cloud server 405, to cause the cloud server 405 to execute one or more of the following operations: (1) receiving a request from the client device for an on-demand vehicular micro cloud to collaborate on a task; (2) determining whether one vehicular micro cloud is sufficient for the task or if a plurality of vehicular micro clouds are needed; (3) determining whether to form the one or more vehicular micro clouds as stationary and/or mobile vehicular micro clouds; (4) forming an on-demand vehicular micro cloud; and (5) causing the on-demand one or more vehicular micro cloud generated at operation (3) to coordinate execution of one or more tasks that are described by data.

The V2X communication methods can be used by the knowledge hub system 100 to determine the location of the vehicle in relation to the dynamic ROI or static ROI. The knowledge hub system 100 examines available resources (e.g., one or more connected vehicles 104, RSE 482, etc.) and elects the best strategy to create the knowledge hubs. The knowledge hubs can be created using V2X communication methods (e.g., V2C communication) and/or short term creation of vehicular micro clouds to share important observations with other nearby vehicles. For example, data comprising the location of the ego vehicle 103 can be captured by one or more vehicle systems 358, vehicle sensors 352, one or more connected vehicles 104 and/or RSE 482. The one or more vehicle systems 358, vehicle sensors 352, one or more connected vehicles 104 and/or RSE 482, can send data comprising the location of the ego vehicle 103 to the knowledge hub circuit 310 located on the cloud server 405. The data is used by the knowledge hub circuit 310 to determine the location of the ego vehicle in relation to the dynamic ROI or static ROI. As the driver of the ego vehicle 103 approaches the dynamic or static ROI, the knowledge hub system 100 notifies the driver of the right-of-way rules associated with the dynamic ROI or static ROI. In one embodiment, the notification methods include the vehicle systems 358 comprising the vehicle audio system 372 and the vehicle dashboard system 376.

The connected vehicle(s) 404 include vehicle systems 458, vehicle sensors 452, memory 439 and processor 446. The vehicle systems 458, vehicle sensors 452, memory 439 and processor 446 include the same and/or similar capabilities as the vehicle systems 358, vehicle sensors 352, memory 438 and processor 445 described herein. In embodiments where in the connected vehicle(s) include the ego vehicle 103 (i.e., the ego vehicle 103 is a "connected vehicle" that communicates with other connected vehicles 404, RSE 482 and/or cloud server 405 via one or more V2X methods of communication), the vehicles systems 458, vehicle sensors 452, memory 439 and processor 446 include vehicle systems 358, vehicle sensors 352, memory 438 and processor 445. In one embodiment, memory 438 and processor 445 are included in ECU 250 as described in FIG. 2.

Figure 5:
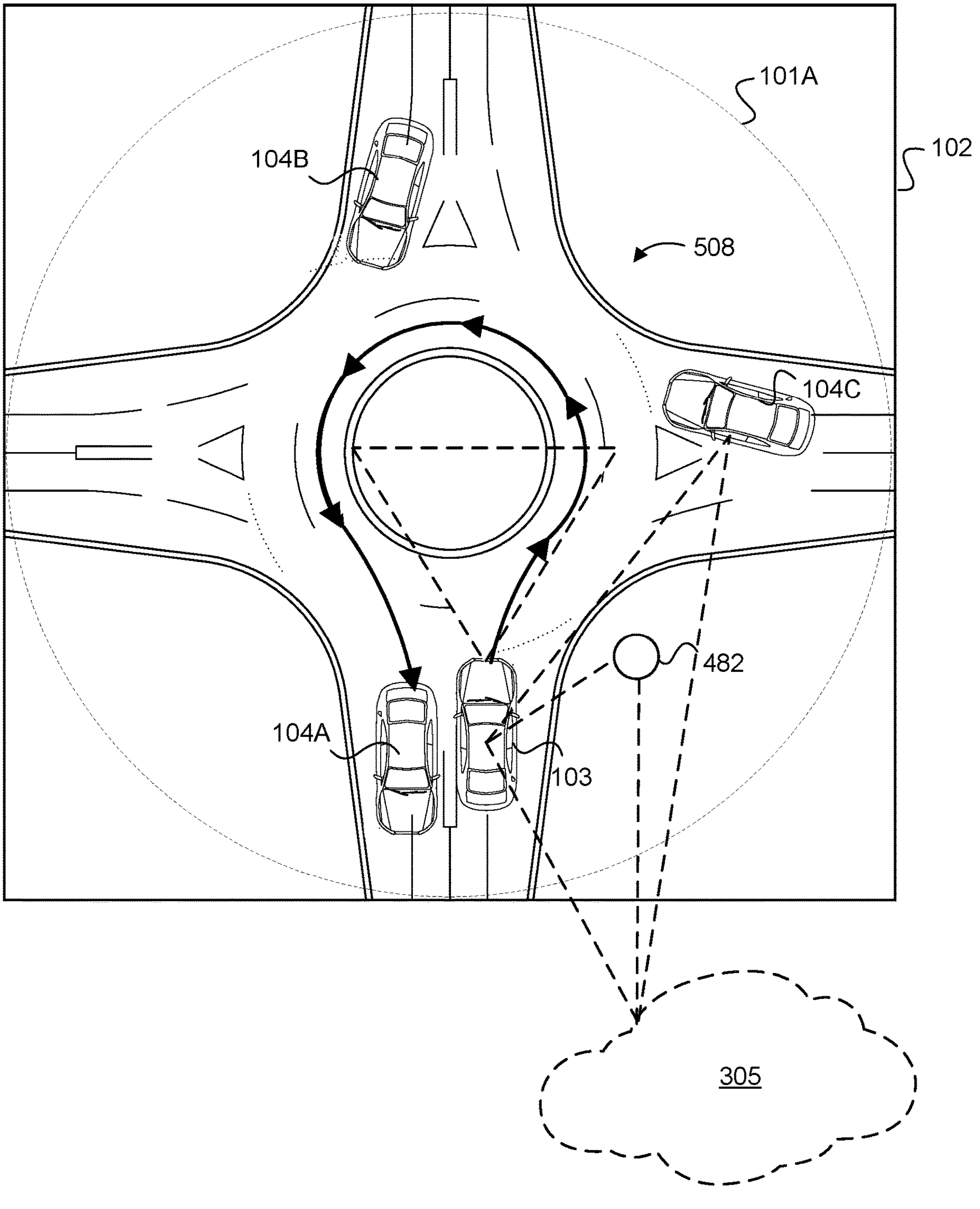
FIG. 5 depicts an example illustration of a static region of interest, according to one embodiment.

FIG. 5 is an example illustration of a static ROI 101A, according to one embodiment. The knowledge hub system 100 generates a static ROI 101A about a roadway feature 508. In this example, the roadway feature 508 includes a roundabout intersection. The roundabout intersection includes a plurality of vehicles 104A-104C. The knowledge hub system 100 uses data to determine the static ROI 101A and to monitor the proximity of the ego vehicle to the static ROI 101A. If the knowledge hub system 100 determines that the vehicle is within a certain proximity, the knowledge hub system 100 notifies the driver of the right-of-way rules associated with the static ROI 101A.

In one embodiment, the knowledge hub circuit 310 is hosted on a cloud server 405. The knowledge hub circuit 310 uses data received from database 315 to determine whether a static ROI 101A exists for a region of a roadway. The knowledge hub circuit 310 further uses data received from database 315 to determine the right-of-way rules associated with the static ROI 101A. When the ego vehicle approaches the static ROI 101A the knowledge hub system 100 notifies the driver of the right-of-way rules associated with the static ROI 101A.

In one embodiment, the knowledge hub circuit 310 monitors the location of the location of the ego vehicle 103 using data received from one or more vehicle positioning systems 358. The one or more vehicle positioning systems 358 send data comprising the location of the ego vehicle 103 to the knowledge hub circuit 310 hosted on the cloud server 405 using V2C methods of communication. The knowledge hub system 100 receives the data from the vehicle positioning system 358, and uses the data to determine the location of the vehicle in relation to the static ROI 101A.

In one embodiment, the knowledge hub circuit 310 monitors the location of the ego vehicle 103 using data received from one or more connected vehicles 104. The one or more connected vehicles 104 capture data comprising the location of the vehicle using V2V methods of communication. The one or more connected vehicles 104 send data to the knowledge hub circuit 310 hosted on the cloud server 405 using V2C methods of communication. The knowledge hub system 100 receives the data from the one or more connected vehicles 104, and uses the data to determine the location of the vehicle in relation to the static ROI 101A.

In one embodiment, the knowledge hub circuit 310 monitors the location of the ego vehicle 103 using data received from RSE 482. The RSE 482 receives data comprising the location of the ego vehicle 103 using V2I methods of communication. The RSE 482 sends data to the knowledge hub system 100 hosted on the cloud server 405. The knowledge hub system 100 receives the data from RSE 482, and uses the data to determine the location of the vehicle in relation to the static ROI 101A.

In one embodiment, the knowledge hub circuit 310 is disposed within the vehicle. The knowledge hub circuit 310 uses data received from one or more vehicle sensors 352, one or more connected vehicles 104, and/or RSE 482 to determine whether the vehicle is approaching a static ROI 101A. In this embodiment, one or more vehicle sensors 352 are configured to capture data comprising roadway information. The data is sent from the one or more vehicle sensors 352 to the ROI engine 303 in the knowledge hub circuit 310. The ROI engine 303 receives the data and uses the data to determine whether a static ROI exists. If the ROI engine 303 determines that a static ROI exists, the ROI engine 303 sends data comprising the type of static to the knowledge hub engine 393. The knowledge hub engine 393 receives the data and determines the right-of-way rules associated with static ROI of interest.

In one embodiment, the knowledge hub circuit 310 receives data from one or more vehicle systems 358 comprising vehicle position system 372. In this embodiment, the knowledge hub circuit 310 receives data comprising the ego vehicle's location sent from the vehicle position system 372. Here, the knowledge hub circuit 310 uses data stored in the ROI engine 303 memory 308 to determine whether the ego vehicle 103 is approaching the static ROI 101A. The static ROI 101A is determined by the ROI engine 303 using data comprising roadway information received from a database 315 at a prior date. The location of the static ROI is stored in memory 308.

Once the knowledge hub system 100 determines that the ego vehicle 103 is within a set distance of the ROI, the knowledge hub system 100 instructs the driver of the right-of-way rules associated with the static ROI using one or methods of notification. The knowledge hub engine 393 receives data comprising right-of-way rules from database 317. The knowledge hub engine 393 uses the data to determine the right-of-way rules for each type of static ROI. The knowledge hub engine 393 stores the right-of-way rules associated with each type of static ROI 101A in memory 398. In one embodiment, the knowledge hub engine 393 uses data comprising right-of-way rules for each type of static ROI received from the database 317. The right-of-way rules for each type of static ROI is stored in memory 398. The knowledge hub engine 393 uses the data stored in memory 398 to determine which right-of-way rules to notify the driver of the ego vehicle 103.

Figure 6:
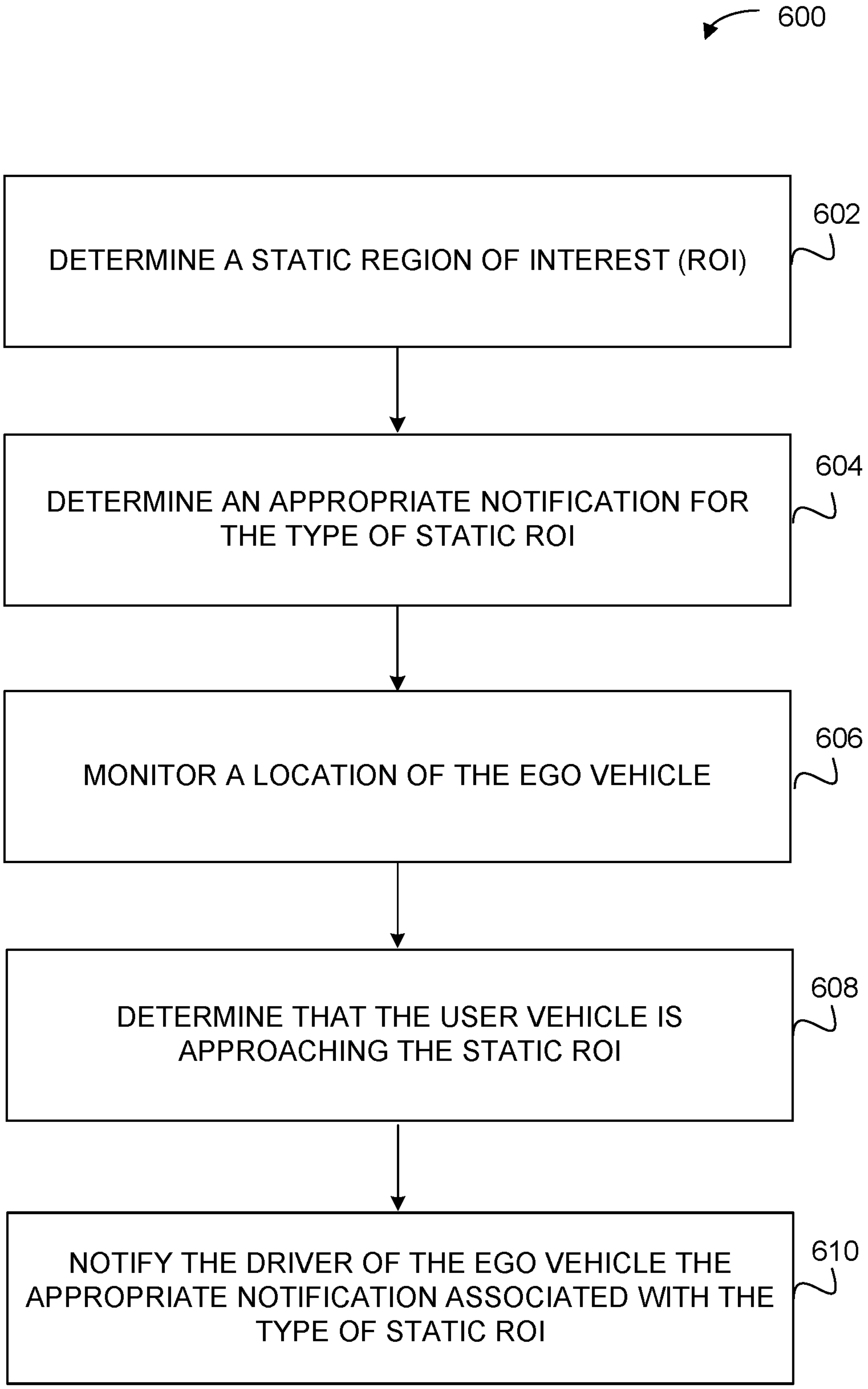
FIG. 6 depicts a method of generating a knowledge hub for a static region of interest, according to one embodiment.

FIG. 6 is an illustration of a method 600 of implementing the knowledge hub system 100 in a static ROI, according to one embodiment. The method includes determining a static ROI, determining one or more right-of-way rules associated with the static ROI, monitoring a location of the user vehicle, determining that the user vehicle has entered into the ROI, notifying the driver of the user vehicle the right-of-way rules associated with the ROI.

At activity 602, the method 600 includes determining a static ROI 101A of potentially confusing and roadway features. In one embodiment, the knowledge hub circuit 310 receives data comprising roadway features from database 315. In one embodiment, database 315 is a DMV database hosting data comprising maps of roadways and roadway features. In one embodiment, the database is a third party database (e.g., a vehicle navigation service provider) hosting data comprising maps of roadways and roadway features.

In one embodiment, the knowledge hub circuit 310 receives data comprising roadway features from one or more vehicle sensors 352, one or more connected vehicles 104, and/or RSE 482. The knowledge hub circuit 310 uses the data to determine whether the roadway features include a static ROI. The one or more vehicle sensors 352 are configured to capture data comprising roadway information. The data is sent from the one or more vehicle sensors 352 to the ROI engine 303 in the knowledge hub circuit 310. The ROI engine 303 receives the data and uses the data to determine whether a static ROI exists. If the ROI engine 303 determines that a static ROI exists, the ROI engine 303 sends data comprising the type of static ROI 101A to the knowledge hub engine 393.

At activity 604, the method 600 includes determining an appropriate notification for the static ROI 101A. The knowledge hub circuit 310 is configured to receive data from one or more data sources comprising instructions on how to engage the static ROI 101A. The instructions can include any data that increases driver situational awareness. In one embodiment the instructions include right-of-way rules for various roadway features (i.e., potentially confusing and roadway features) from database 317. In one embodiment, database 317 is a DMV database. In another embodiment, the database is a database comprising right-of-way rules for each roadway feature. In one example, the data includes instructions on how to engage a roundabout. In another example, the data includes instructions on how to engage an intersection comprising a traffic light suffering from a malfunction. Providing the driver of the ego vehicle 103 with information regarding how to engage the static ROI allows the driver to develop/increase his/her situational awareness thereby increasing driver and passenger safety.

Once the knowledge hub system 100 determines the appropriate notification for the type of static ROI, the knowledge hub system 100 generates a knowledge hub about the static ROI via the plurality of methods described herein. The knowledge hub system 100 examines available resources such as one or more connected vehicles 104 and RSE 482 and elects the best strategy to create the knowledge hubs.

In one embodiment, the knowledge hub is formed using one or more connected vehicles 104 to form a vehicular micro cloud by which a micro cloud leader can coordinate knowledge hub data dissemination. In another embodiment, the knowledge hub is formed on the cloud server 405. As discussed in greater detail at activity 610, the knowledge hub system 100 can use V2X communication methods to inform each connected vehicle of the knowledge hub about the static ROI. For example, the cloud server 405 can use V2C communication methods to inform each connected vehicle 104 of instructions on how to proceed about the static ROI.

At activity 606, the method 600 includes monitoring the location of the ego vehicle 103. The knowledge hub circuit 310 receives data from one or more sensors 352, one or more vehicle systems 358 (e.g., the vehicle positioning system 372), one or more connected vehicles 104 and/or RSE 482. The one or more connected vehicles 104 and RSE 482 communicate with the knowledge hub circuit 310 via V2X communication methods.

In one embodiment, the knowledge hub circuit 310 monitors the location of the location of the ego vehicle 103 using data received from one or more vehicle positioning systems 358. The one or more vehicle positioning systems 358 send data comprising the location of the ego vehicle 103 to the knowledge hub circuit 310 hosted on the cloud server 405 using V2C methods of communication. The knowledge hub system 100 receives the data from the vehicle positioning system 358, and uses the data to determine the location of the vehicle in relation to the static ROI 101A.

In one embodiment, the knowledge hub circuit 310 monitors the location of the ego vehicle 103 using data received from one or more connected vehicles 104. The one or more connected vehicles 104 capture data comprising the location of the vehicle using V2V methods of communication. The one or more connected vehicles 104 send data to the knowledge hub circuit 310 hosted on the cloud server 405 using V2C methods of communication. The knowledge hub system 100 receives the data from the one or more connected vehicles 104, and uses the data to determine the location of the vehicle in relation to the static ROI 101A.

In one embodiment, the knowledge hub circuit 310 monitors the location of the ego vehicle 103 using data received from RSE 482. The RSE 482 receives data comprising the location of the ego vehicle 103 using V2I methods of communication. The RSE 482 sends data to the knowledge hub system 100 hosted on the cloud server 405. The knowledge hub system 100 receives the data from RSE 482, and uses the data to determine the location of the vehicle in relation to the static ROI.

In one embodiment, the knowledge hub circuit 310 receives data from one or more vehicle systems 358 comprising vehicle position system 372. In this embodiment, the knowledge hub circuit 310 receives data comprising the ego vehicle's location sent from the vehicle position system 372. Here, the knowledge hub circuit 310 uses data stored in the ROI engine 303 memory 308 to determine whether the ego vehicle 103 is approaching the static ROI. The static ROI is determined by the ROI engine 303 using data comprising roadway information received from a database 315 at a prior date. The location of the static ROI is stored in memory 308.

At activity 608, the method 600 includes determining that the ego vehicle 103 is approaching the ROI. In one embodiment, the knowledge hub system 100 uses data captured from one or more vehicle sensors 352 and/or vehicle system 358 to determine the location of the ego vehicle 103 in relation to the static ROI. When the ego vehicle 103 is within the set distance of the static ROI, the knowledge hub system 100 notifies the driver of the appropriate notification associated with the static ROI. For example, in one embodiment, when the knowledge hub circuit 310 determines that the ego vehicle 103 is approaching the static ROI comprising a roadway feature, the knowledge hub circuit 310 notifies the driver of the right-of-way rules via one or more vehicle systems 358 comprising the vehicle audio system 374, vehicle dashboard system 376 and/or vehicle display system 380.

At activity 610, the method 600 includes notifying the driver of the user vehicle the appropriate notification associated with the ROI. In one embodiment, the appropriate notification associated with the roadway is transmitted to the driver of the ego vehicle as instructions as to how to navigate a geographical portion of the roadway. By notifying driver of the appropriate notification, the knowledge hub system 100 can provide the driver with instructions on how to proceed, before the driver engages with the roadway. For example, when the ego vehicle approaches the static ROI comprising the roundabout intersection, the knowledge hub system notifies the driver of the ego vehicle the right-of-way rules for navigating the roundabout intersection. By notifying the driver of the right-of-way rules for a roundabout intersection, the driver may make various driving decision to appropriately navigate the roundabout. In another example, if a driver is approaching an intersection with the traffic light failure (e.g., a power loss to the traffic signals), the knowledge hub system 100 can notify the driver of instructions on how to proceed through the intersection. Notifying the driver of the ego vehicle 103 the instructions associated with the type of static ROI 101A allows the driver to develop situational awareness. Developing situational awareness can decrease the likelihood of vehicular accidents, and improve driver and passenger safety.

In one embodiment, the notification methods include notifying the driver of the ego vehicle 103 via one or more vehicle systems 358. For example, in one embodiment, the driver is notified of the right-of-way rules via the vehicle audio system 374, the vehicle display system 380 and/or the vehicle dashboard system 376. In one embodiment, the driver is notified of the right-of-way rules associated with each respective ROI by a navigation system within the instrument cluster and the dashboard GUI. The notification can include visual instructions (e.g., visual directions on how to proceed), and/or auditory instructions (e.g., verbal commands from the knowledge hub system 100 to the driver).

Figure 7:
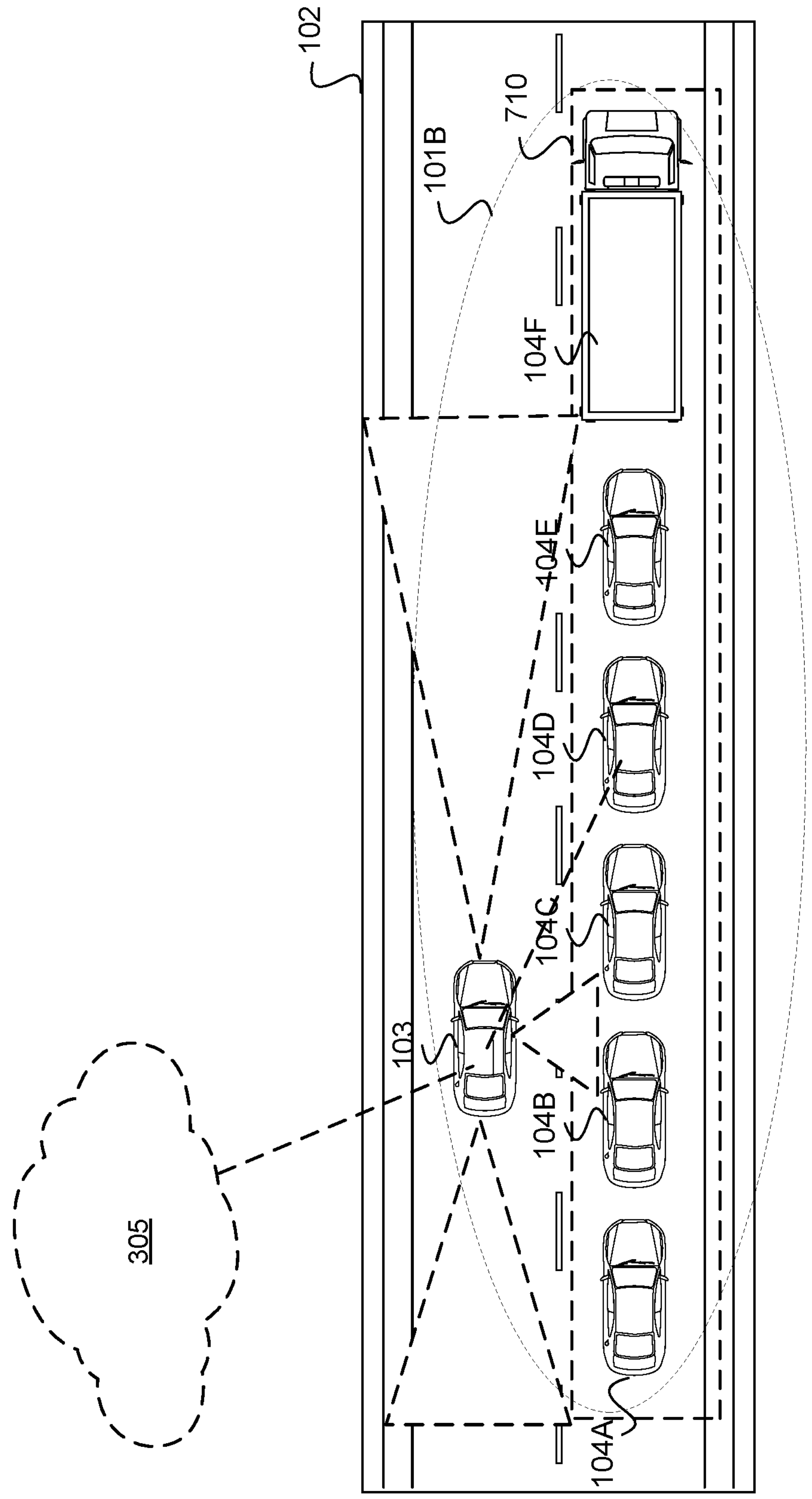
FIG. 7 depicts an example illustration of a dynamic region of interest, according to one embodiment.

FIG. 7 is an example illustration of a dynamic ROI 101B, according to one embodiment. The dynamic ROI 101B includes a traffic pattern 710. In this example, the traffic pattern 710 includes a platoon of vehicles. The platoon of vehicles includes a plurality of vehicles 104A-104F. The knowledge hub system 100 uses data to determine the dynamic ROI 101B, and to monitor the proximity of the ego vehicle 103 to the dynamic ROI 101B. If the knowledge hub system 100 determines that the vehicle is within a certain proximity, the knowledge hub system 100 notifies the driver of the right-of-way rules associated with the dynamic ROI 101B.

In one embodiment, the knowledge hub circuit 310 is hosted on a cloud server 405. The knowledge hub circuit 310 uses data received from database 315 to determine whether a dynamic ROI 101B exists for a region of a roadway. The knowledge hub circuit 310 further uses data received from database 315 to determine the right-of-way rules associated with the dynamic ROI 101B. When the ego vehicle approaches the dynamic ROI 101B the knowledge hub system 100 notifies the driver of the right-of-way rules associated with the dynamic ROI 101B.

In one embodiment, the knowledge hub circuit 310 monitors the location of the location of the ego vehicle 103 using data received from one or more vehicle positioning systems 358. The one or more vehicle positioning systems 358 send data comprising the location of the ego vehicle 103 to the knowledge hub circuit 310 hosted on the cloud server 405 using V2C methods of communication. The knowledge hub system 100 receives the data from the vehicle positioning system 358, and uses the data to determine the location of the vehicle in relation to the dynamic ROI 101B.

In one embodiment, the knowledge hub circuit 310 monitors the location of the ego vehicle 103 using data received from one or more connected vehicles 104. The one or more connected vehicles 104 capture data comprising the location of the vehicle using V2V methods of communication. The one or more connected vehicles 104 send data to the knowledge hub circuit 310 hosted on the cloud server 405 using V2C methods of communication. The knowledge hub system 100 receives the data from the one or more connected vehicles 104, and uses the data to determine the location of the vehicle in relation to the dynamic ROI.

In one embodiment, the knowledge hub circuit 310 monitors the location of the ego vehicle 103 using data received from RSE 482. The RSE 482 receives data comprising the location of the ego vehicle 103 using V2I methods of communication. The RSE 482 sends data to the knowledge hub system 100 hosted on the cloud server 405. The knowledge hub system 100 receives the data from RSE 482, and uses the data to determine the location of the vehicle in relation to the dynamic ROI 101B.

In one embodiment, the knowledge hub circuit 310 is disposed within the ego vehicle 103. In another embodiment, the knowledge hub circuit 310 can be disposed within or one or more connected vehicle 104 in a platoon of vehicles as described herein. The one or more connected vehicles 104 can inform any connected vehicle (e.g., the ego vehicle 103) whenever the ego vehicle 103 enters into communication range of the platoon. The knowledge hub circuit 310 uses data received from one or more vehicle sensors 352, one or more connected vehicles 104, and/or RSE 482 to determine whether the vehicle is approaching the dynamic ROI 101B. In this embodiment, one or more vehicle sensors 352 are configured to capture data comprising traffic patterns. The data is sent from the one or more vehicle sensors 352 to the ROI engine 303 in the knowledge hub circuit 310. The ROI engine 303 receives the data and uses the data to determine whether a dynamic ROI 101B exists. If the ROI engine 303 determines that a dynamic ROI 101B exists, the ROI engine 303 sends data comprising the type of dynamic ROI to the knowledge hub engine 393. The knowledge hub engine 393 receives the data and determines the right-of-way rules associated with static ROI of interest.

In one embodiment, the knowledge hub circuit 310 receives data from one or more vehicle systems 358 comprising vehicle position system 372. In this embodiment, the knowledge hub circuit 310 receives data comprising the ego vehicle 103 location sent from the vehicle position system 372. The knowledge hub circuit 310 uses data stored in the ROI engine 303 memory 308 to determine whether the ego vehicle 103 is approaching the dynamic ROI 101B. Here, the knowledge hub circuit 310 uses data stored in the ROI engine 303 memory 308 to determine whether the ego vehicle 103 is approaching the dynamic ROI 101B. The dynamic ROI 101B is determined by the ROI engine 303 using data comprising roadway information received from a database 315 at a prior date. The location of the dynamic ROI 101B is stored in memory 308.

Once the knowledge hub system 100 determines that the ego vehicle 103 is within a set distance of the dynamic ROI 101B, the knowledge hub system 100 instructs the driver of the right-of-way rules associated with the dynamic ROI 101B using one or methods of notification. The knowledge hub engine 393 receives data comprising right-of-way rules from database 317. The knowledge hub engine 393 uses the data to determine the right-of-way rules for each type of dynamic ROI. The knowledge hub engine 393 stores the right-of-way rules associated with each type of static ROI in memory 398. In one embodiment, the knowledge hub engine 393 uses data comprising right-of-way rules for each type of dynamic ROI 101B received from the database 317. The right-of-way rules for each type of static ROI is stored in memory 398. The knowledge hub engine 393 uses the data stored in memory 398 to determine which right-of-way rules to notify the driver of the ego vehicle 103.

In one embodiment, the driver of the ego vehicle may not understand how to proceed with a platoon of vehicles. If each vehicle in the platoon of vehicles changes lanes the driver of the ego vehicle may not know how to proceed. For example, if the platoon of vehicles shifts over to an adjacent lane all together, or in a one by one fashion (e.g., starting from either the first or last vehicle in the platoon and shifting lanes one by one in a zipper like formation), the driver may not understand how to proceed. The knowledge hub system 100 can inform the driver of how to proceed. The ability of the knowledge hub system 100 to inform the driver increases the driver's situational awareness thereby improving driver and passenger safety of the ego vehicle and surrounding vehicles.

Figure 8:
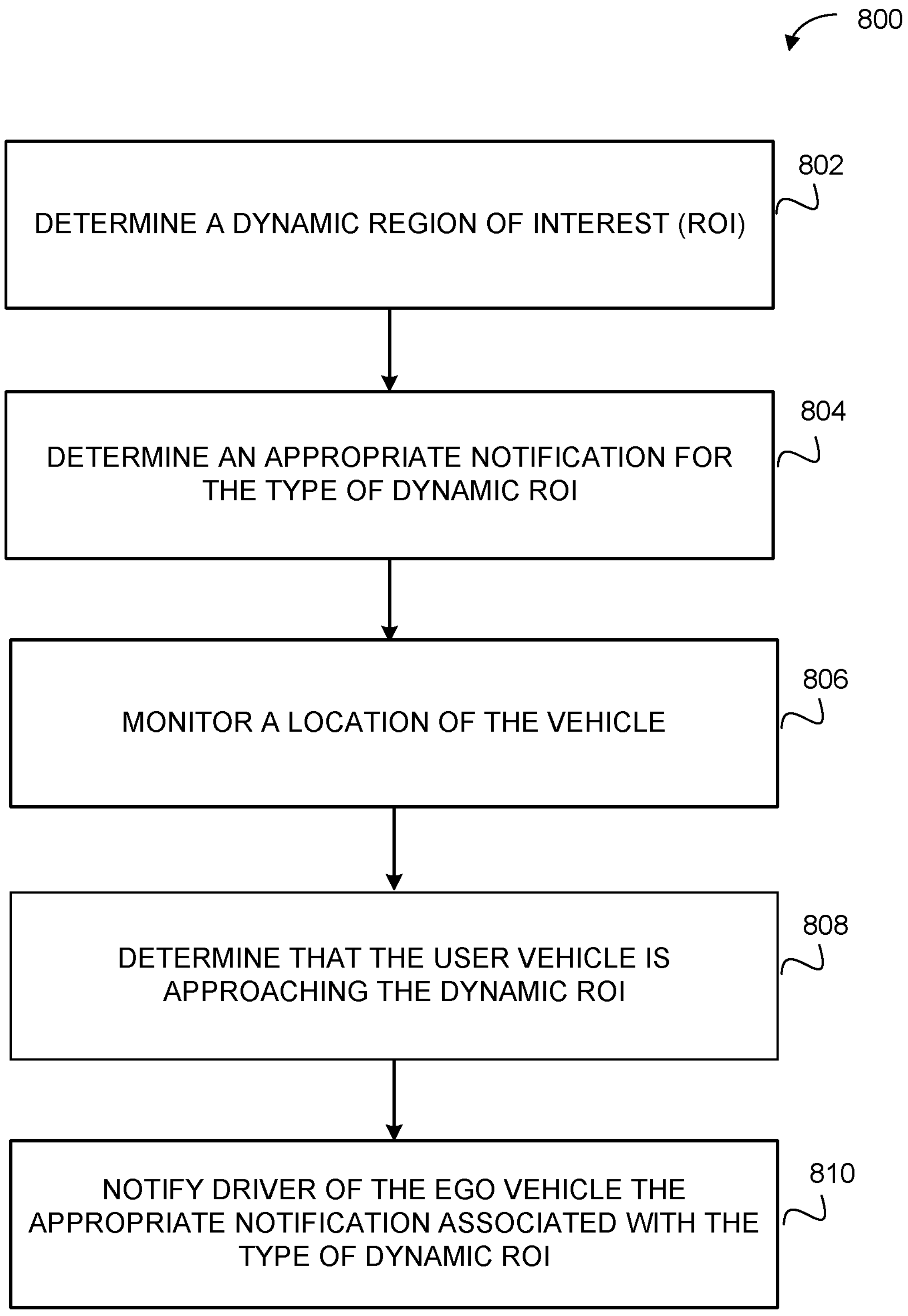
FIG. 8 depicts a method of generating a knowledge hub for a dynamic region of interest, according to one embodiment.

FIG. 8 is an illustration of a method 800 of implementing the knowledge hub system 100 in a dynamic ROI, according to one embodiment. The method 800 includes determining a ROI, generate knowledge hub for right-of-way rules associated with associated with a type of dynamic ROI 101B, determining the user vehicle has entered into the ROI, and notifying the driver of the user vehicle the right-of-way rules associated with the type of dynamic ROI 101B.

At activity 802, the method 800 includes determining a dynamic ROI comprising a or potentially confusing traffic pattern. The knowledge hub circuit 310 receives data comprising the or potentially confusing traffic pattern. In one embodiment, the ROI engine 303 receives data from one or more vehicle sensors 352 and/or one or more connected vehicles 104. The ROI engine 303 uses the data to determine whether the data includes a dynamic ROI 101B.

In one embodiment, one or more vehicle sensors 352 are configured to capture data comprising the traffic pattern. The data is sent from the one or more vehicle sensors 352 to the ROI engine 303 in the knowledge hub circuit 310. The ROI engine 303 uses the data to determine whether the traffic pattern requires a static ROI. If the ROI engine 303 determines that a static ROI exists, the ROI engine 303 sends data comprising the type of dynamic ROI 101B to the knowledge hub engine 393.

At activity 804, the method 800 includes determining an appropriate notification for the dynamic ROI 101B. The knowledge hub circuit 310 is configured to receive data from one or more data sources comprising instructions on how to engage the dynamic ROI 101B. The instructions can include any data that increases driver situational awareness. In one embodiment, the instructions include right-of-way rules for various traffic patterns (i.e., potentially confusing and traffic patterns) stored in database 315. In one embodiment, database 317 is a DMV database. In one example, the data includes instructions on how to approach/engage/participate within a platoon of vehicles. The driver of the ego vehicle 103 may not understand how to proceed with a platoon of vehicles. If each vehicle in the platoon of vehicles changes lanes the driver of the ego vehicle may not know how to proceed. The knowledge hub system 100 can inform the driver of how to proceed. Providing the driver of the ego vehicle 103 with information regarding how to engage the dynamic ROI allows the driver to develop/increase his/her situational awareness thereby increasing driver and passenger safety.

Once the knowledge hub system 100 determines the appropriate notification for the type of dynamic ROI, the knowledge hub system 100 generates a knowledge hub about the dynamic ROI via the plurality of methods described herein. The knowledge hub system 100 examines available resources such as one or more connected vehicles 104 and RSE 482 and elects the best strategy to create the knowledge hubs.

In one embodiment, the knowledge hub is formed using one or more connected vehicles 104 to form a vehicular micro cloud by which a micro cloud leader can coordinate knowledge hub data dissemination. In another embodiment, the knowledge hub is formed on the cloud server 405. As discussed in greater detail at activity 610, the knowledge hub system 100 can use V2X communication methods to inform each connected vehicle of the knowledge hub about the dynamic ROI. For example, the cloud server 405 can use V2X communication methods to inform each connected vehicle 104 of instructions on how to proceed about the dynamic ROI.

At activity 806, the method 800 includes monitoring the location of the ego vehicle 103. The knowledge hub circuit 310 receives data comprising the location of the ego vehicle 103 from one or more sensors 352, one or more vehicle systems 358 (e.g., the vehicle positioning system 372) and/or one or more connected vehicles 104. The one or more connected vehicles 104 and RSE 482 communicate with the knowledge hub circuit 310 via V2X communication methods.

In one embodiment, the knowledge hub circuit 310 monitors the location of the ego vehicle 103 using data received from one or more connected vehicles 104. The one or more connected vehicles 104 capture data comprising the location of the vehicle using V2V methods of communication. The one or more connected vehicles 104 send data to the knowledge hub circuit 310 hosted on the cloud server 405 using V2C methods of communication. The knowledge hub system 100 receives the data from the one or more connected vehicles 104, and uses the data to determine the location of the vehicle in relation to the dynamic ROI 101B.

In one embodiment, the knowledge hub circuit 310 receives data from one or more vehicle systems 358 comprising vehicle position system 372. In this embodiment, the knowledge hub circuit 310 receives data comprising the ego vehicle's location sent from the vehicle position system 372. Here, the knowledge hub circuit 310 uses the data to determine whether the ego vehicle 103 is approaching the dynamic ROI 101B.

At activity 808, the method 800 includes determining that the user vehicle is approaching the dynamic ROI. In one embodiment, the knowledge hub system 100 uses data captured from one or more vehicle sensors 352 and/or vehicle system 358 to determine the location of the ego vehicle 103 in relation to the static ROI. When the ego vehicle 103 is within the set distance of the dynamic ROI, the knowledge hub system 100 notifies the driver of the appropriate notification associated with the dynamic ROI 101B. For example, in one embodiment, when the cloud server 405 determines that one or more connected vehicle are in a traffic pattern (i.e., a dynamic ROI) within a proximity of the ego vehicle, the cloud server sends right-of-way rules to the ego vehicle using V2X communication.

Figure 9:
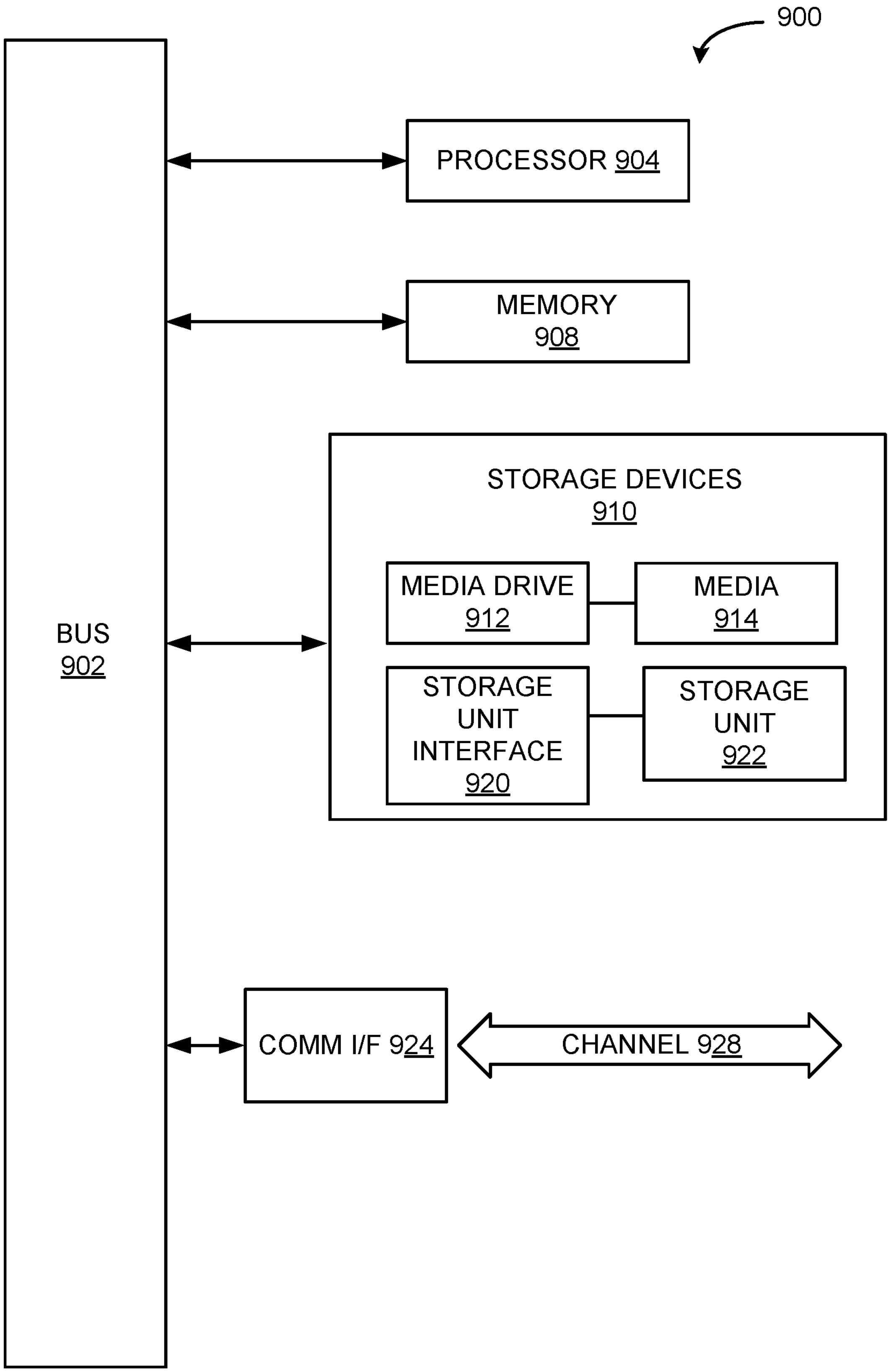
FIG. 9 is an example computing component that may be used to implement various features of embodiments described in the present disclosure.

At activity 810, the method 800 includes notifying the driver of the ego vehicle the appropriate notification associated with the type of dynamic ROI 101B. In one embodiment, the appropriate notification includes instructions on how to navigate a geographical portion of the roadway comprising a traffic pattern. For example, when the ego vehicle approaches the dynamic ROI 101B, the knowledge hub system notifies the driver of the ego vehicle the right-of-way rules for navigating the potentially confusing or traffic pattern. By notifying the driver of the right-of-way rules for the type of dynamic ROI, the knowledge hub system increases the drivers situational awareness on how to appropriately navigate the dynamic ROI.

Where components are implemented in whole or in part using software, these software elements can be implemented to operate with a computing or processing component capable of carrying out the functionality described with respect thereto. One such example computing component is shown in FIG. 9. Various embodiments are described in terms of this example computing component 900 After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and the storage unit interface 920. Examples of such storage units 922 and storage unit interfaces 920 can include a program cartridge and cartridge interface, a removable memory (for example, a flash memory or other removable memory component) and memory slot. Other examples may include a PCMCIA slot and card, and other fixed or removable storage units 922 and storage unit interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit interface 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:

at least one memory storing machine-executable instructions; and at least one processor configured to access the at least one memory and execute the machine-executable instructions to:

determine a static region of interest comprising a geographical portion of a roadway comprising a roadway feature;

examine available resources comprising at least one of: (i) connected vehicles or (ii) roadside equipment to generate a knowledge hub about the static region of interest;

determine, using the knowledge hub, a plurality of appropriate notifications associated with the static region of interest at a plurality of corresponding distances from the static region of interest, wherein each appropriate notification comprises instructions for a vehicle to navigate the geographical portion of the roadway comprising the roadway feature according to a distance of the vehicle from the static region of interest;

monitor, using the knowledge hub, a location of a first vehicle to determine whether the first vehicle has entered within a parameter of the static region of interest; and notify, via the knowledge hub, a driver of the first vehicle of the appropriate notification associated with the static region of interest based on the distance between the first vehicle and the static region of interest.

2. The system of claim 1, wherein the appropriate notification associated with the static region of interest comprises one or more right-of-way rules stored in a memory storage device on a cloud server.

3. The system of claim 2, wherein the one or more right-of-way rules are stored in a second memory storage device in the first vehicle.

4. The system of claim 3, further comprising displaying to the driver the one or more right-of-way rules by displaying the one or more right-of-way rules on a dashboard of the first vehicle.

5. The system of claim 1, wherein the roadway feature comprises a roundabout.

6. The system of claim 1, wherein the roadway feature comprises a four-way intersection comprising at least one offset roadway, wherein the at least one offset roadway comprises a roadway that terminates at the four-way intersection.

7. The system of claim 6, wherein the at least one offset roadway comprises an imaginary centerline that terminates at the four-way intersection.

8. The system of claim 1, further comprising providing audible instructions to the driver via one or more vehicle speakers.

9. The system of claim 1, wherein monitoring the location of the first vehicle comprises determining the location of the first vehicle using one or more object detection systems.

10. The system of claim 1, wherein monitoring the location of the first vehicle comprises determining the location of the first vehicle using a vehicle to vehicle communication method.

11. The system of claim 1, wherein monitoring the location of the first vehicle comprises determining the location of the first vehicle using a vehicle to cloud and cloud to vehicle communication method.

12. A method of generating a knowledge hub comprising:

determining a dynamic region of interest comprising a geographical portion of a roadway comprising a moving-roadway feature;

examine available resources comprising at least one of: (i) connected vehicles and (ii) roadside equipment to generate a knowledge hub about the dynamic region of interest;

determining, using the knowledge hub, an appropriate notification associated with the dynamic region of interest, wherein the appropriate notification comprises instructions for a vehicle to navigate the geographical portion of the roadway comprising the roadway feature according to a distance of the vehicle from the dynamic region of interest;

monitoring, using the knowledge hub, a geographical location of a first vehicle;

determining that the first vehicle has entered within a parameter of the dynamic region of interest;

sending, via the knowledge hub, the appropriate notification to the first vehicle upon determination of the first vehicle entering within the parameter of the dynamic region of interest; and displaying to a driver of the first vehicle the appropriate notification associated with the dynamic region of interest.

13. The method of claim 12, wherein the roadway feature includes a platoon of vehicles comprising a plurality of vehicles traveling in a same lane of the roadway at about a same speed at about a same distance from one another.

14. The method of claim 12, wherein the appropriate notification comprises one or more right-of-way rules are stored in a memory storage device on a cloud server.

15. The method of claim 14, wherein the one or more right-of-way rules are stored in a second memory storage device in the first vehicle.

16. The method of claim 15, wherein displaying to the driver the one or more right-of-way rules comprises displaying the one or more right-of-way rules on a dashboard of the first vehicle.

17. The method of claim 12, further comprising providing audible instructions to the driver via one or more vehicle speakers.

18. The method of claim 12, wherein monitoring the geographical location of the first vehicle comprises determining the geographical location of the first vehicle using one or more object detection systems.

19. The method of claim 12, wherein monitoring the geographical location of the first vehicle comprises determining the geographical location of the first vehicle using a vehicle to vehicle communication method.

20. A system comprising:

at least one memory storing machine-executable instructions; and at least one processor configured to access the at least one memory and execute the machine-executable instructions to:

determine a region of interest comprising a geographical portion of a roadway;

examine available resources comprising at least one of: (i) connected vehicles and (ii) roadside equipment to generate a knowledge hub about the region of interest;

determine, using the knowledge hub, an appropriate notification associated with the region of interest, wherein the appropriate notification comprising instructions for a vehicle to navigate the geographical portion of the roadway according to a distance of the vehicle from the region of interest;

monitor, using the knowledge hub, a location of a first vehicle to determine whether the first vehicle has entered within a parameter of the region of interest; and notify, using the knowledge hub, a driver of the first vehicle of the appropriate notification associated with the region of interest when the first vehicle enters within the parameter of the region of interest.

* * * * *